United States Patent
Fujita et al.

(10) Patent No.: US 9,322,563 B2
(45) Date of Patent: Apr. 26, 2016

(54) HUMIDITY CONTROL MODULE AND HUMIDITY CONTROL APPARATUS

(75) Inventors: Naotoshi Fujita, Osaka (JP); Shuji Ikegami, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 114 days.

(21) Appl. No.: 14/344,819

(22) PCT Filed: Sep. 14, 2012

(86) PCT No.: PCT/JP2012/005901
§ 371 (c)(1),
(2), (4) Date: Mar. 13, 2014

(87) PCT Pub. No.: WO2013/038708
PCT Pub. Date: Mar. 21, 2013

(65) Prior Publication Data
US 2014/0374929 A1    Dec. 25, 2014

(30) Foreign Application Priority Data
Sep. 16, 2011   (JP) .................. 2011-203674

(51) Int. Cl.
*F24F 3/14* (2006.01)
*B01F 3/04* (2006.01)
(Continued)

(52) U.S. Cl.
CPC ... *F24F 3/14* (2013.01); *B01F 3/04* (2013.01); *F24F 3/147* (2013.01); *F24F 3/1417* (2013.01); *F24F 11/0008* (2013.01); *F28D 21/0015* (2013.01); *F24F 2003/1435* (2013.01)

(58) Field of Classification Search
CPC .................................. B01F 3/04; F24F 3/147

USPC .......... 95/45, 52; 96/4; 261/152, 154; 62/92, 62/314
See application file for complete search history.

(56) References Cited

U.S. PATENT DOCUMENTS

| 2005/0109052 A1 | 5/2005 | Albers et al. |
| 2008/0110191 A1 | 5/2008 | Lowenstein et al. |

(Continued)

FOREIGN PATENT DOCUMENTS

| JP | 50-37254 A | 4/1975 |
| JP | 50-37255 A | 4/1975 |

(Continued)

OTHER PUBLICATIONS

International Search Report, mailed Nov. 20, 2012, issued in PCT/JP2012/005901.

(Continued)

*Primary Examiner* — Robert A Hopkins
(74) *Attorney, Agent, or Firm* — Birch, Stewart, Kolasch & Birch, LLP

(57) ABSTRACT

A humidity control module, in which liquid absorbent exchanges air and moisture, reduces a temperature change in the liquid absorbent. A humidity control module includes a partition member and a heat transfer member. The partition member separates an air passage from an absorbent passage. The partition member is wholly or partially formed by a moisture permeable membrane. The liquid absorbent flowing through the absorbent passage exchanges the moisture with the air flowing through the air passage via the moisture permeable membrane. The heat transfer member is provided in the absorbent passage and surrounded by the liquid absorbent. A heat medium flowing through the heat transfer member exchanges heat with the liquid absorbent flowing through the absorbent passage.

9 Claims, 22 Drawing Sheets

(51) Int. Cl.
*F24F 3/147* (2006.01)
*F28D 21/00* (2006.01)
*F24F 11/00* (2006.01)

(56) References Cited

U.S. PATENT DOCUMENTS

2010/0319370 A1 12/2010 Kozubal et al.
2013/0186121 A1* 7/2013 Erb .................. F24F 3/1417
62/238.1

FOREIGN PATENT DOCUMENTS

| | | |
|---|---|---|
| JP | 56-24017 A | 3/1981 |
| JP | 62-117613 A | 5/1987 |
| JP | 64-22324 A | 1/1989 |
| JP | 5-146627 A | 6/1993 |
| JP | 7-198162 A | 8/1995 |
| JP | 8-189667 A | 7/1996 |
| JP | 11-137948 A | 5/1999 |
| JP | 2000-279745 A | 10/2000 |
| JP | 2003-232546 A | 8/2003 |
| JP | 2011-511244 A | 4/2011 |
| WO | WO 2008/078194 A2 | 7/2008 |

OTHER PUBLICATIONS

Notice of Reasons for Rejections issued for Japanese Patent Application No. 2012-202387 on Nov. 20, 2012.

* cited by examiner

FIG.10
(A)
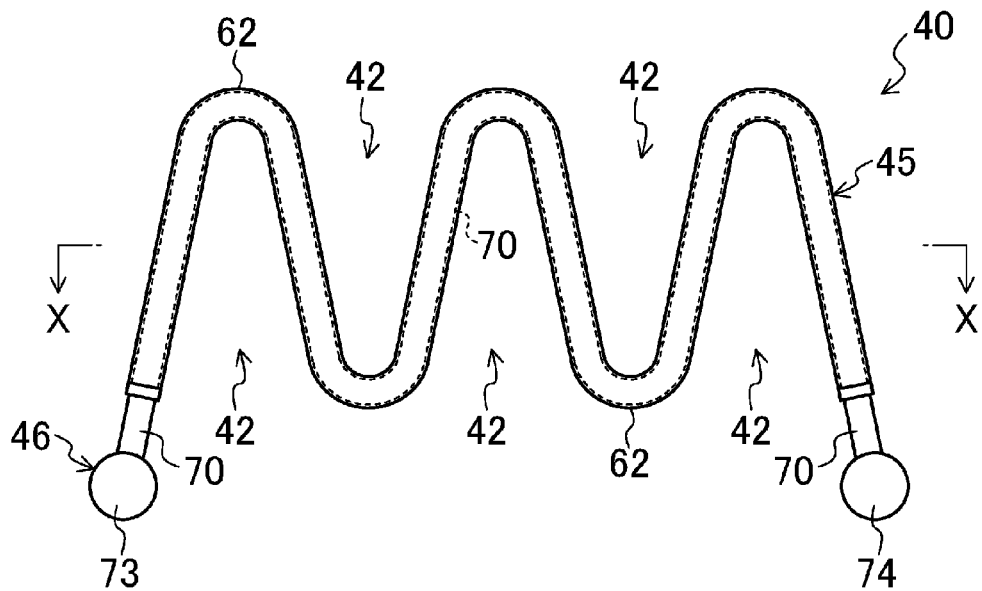
(B)
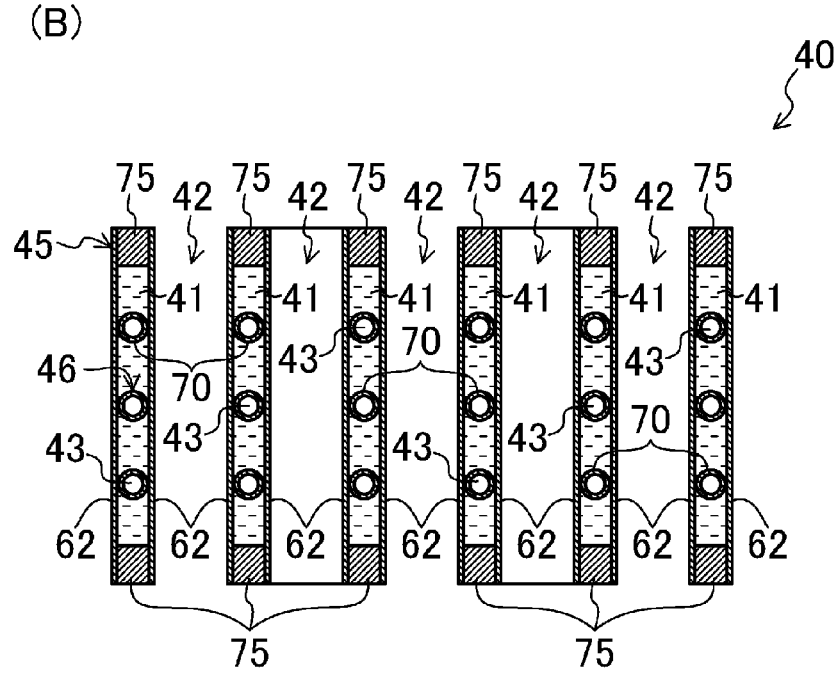

FIG.11 (A) (B)

FIG.17
(a)
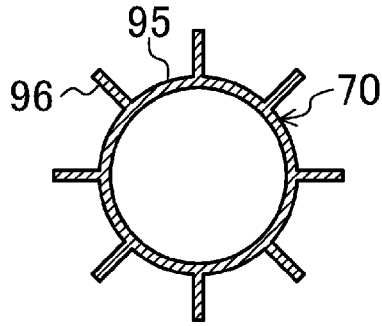
(b)
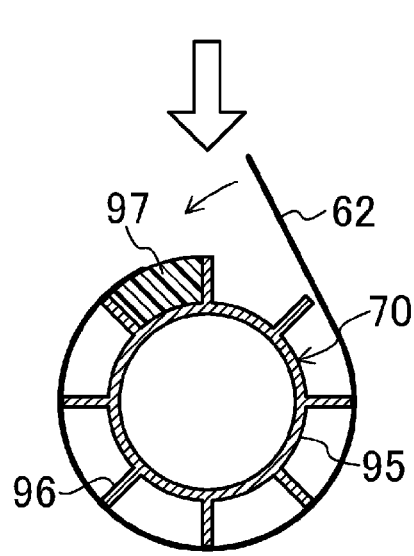
(c)
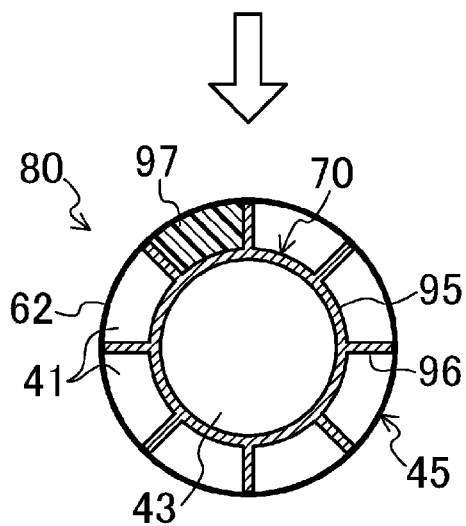

FIG.18
(a)
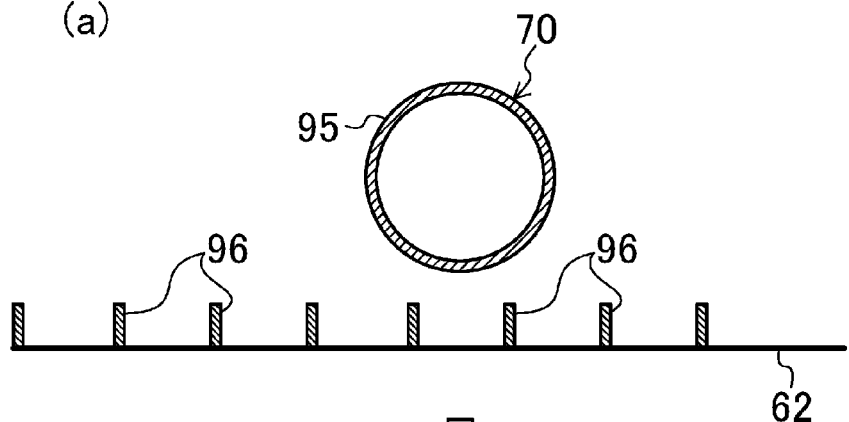
(b)
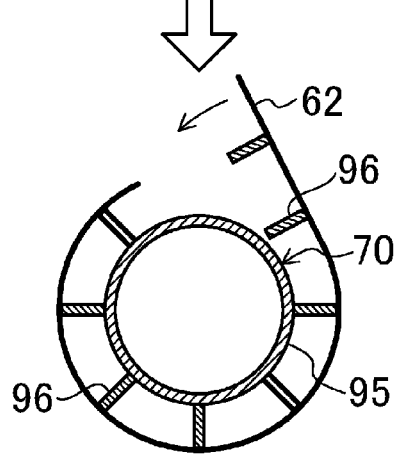
(c)
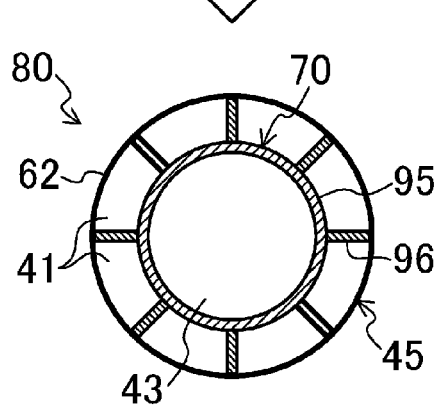

FIG.20
(A)
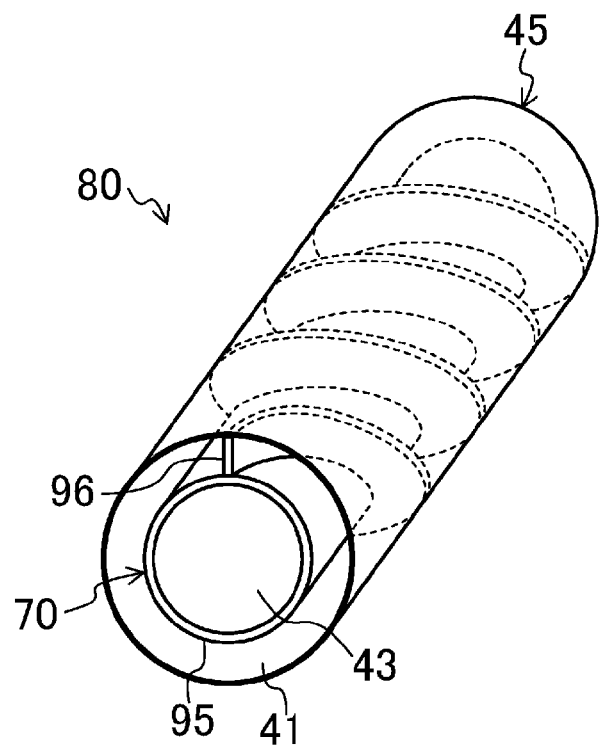
(B)
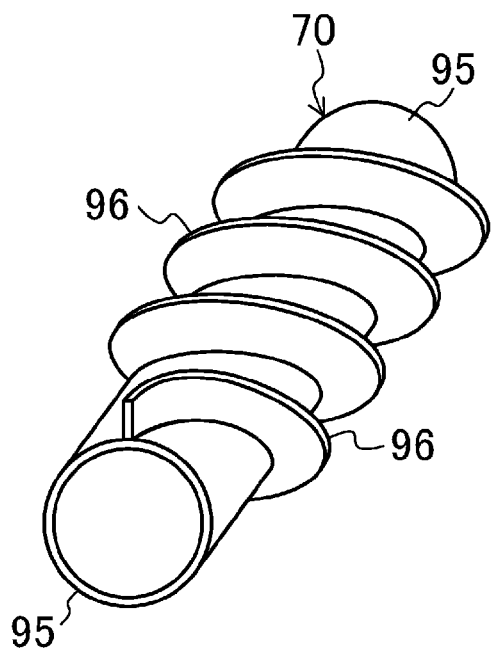

FIG.21
(A)
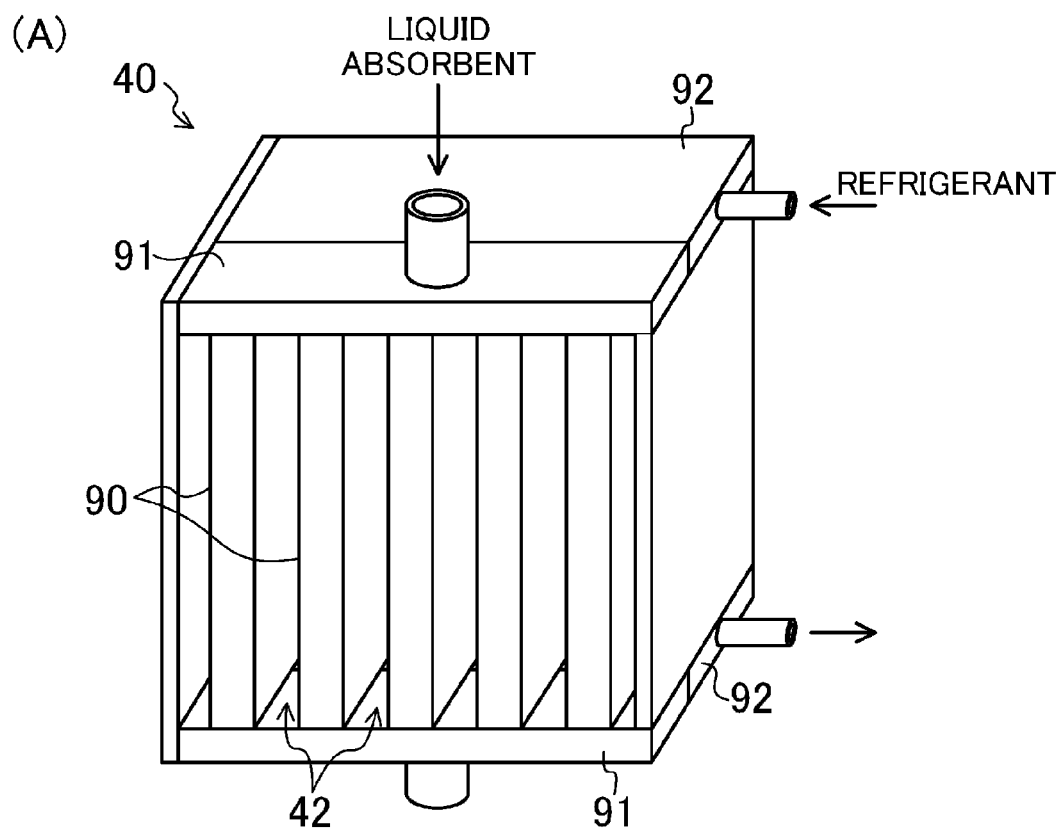
(B)
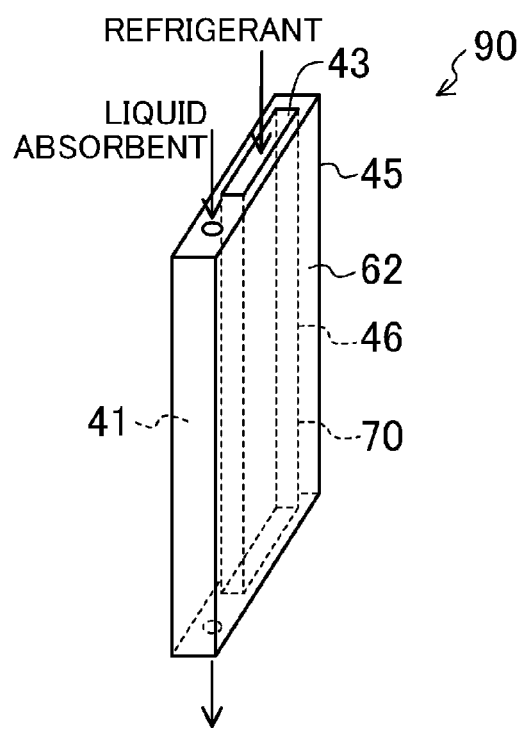

FIG.22
(A)
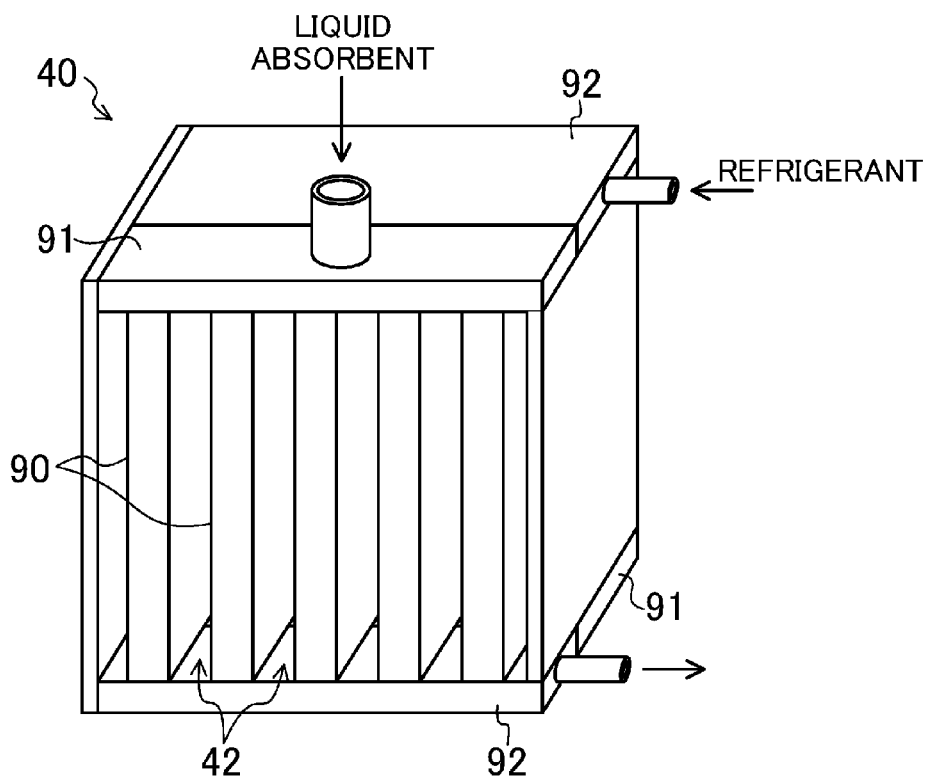
(B)
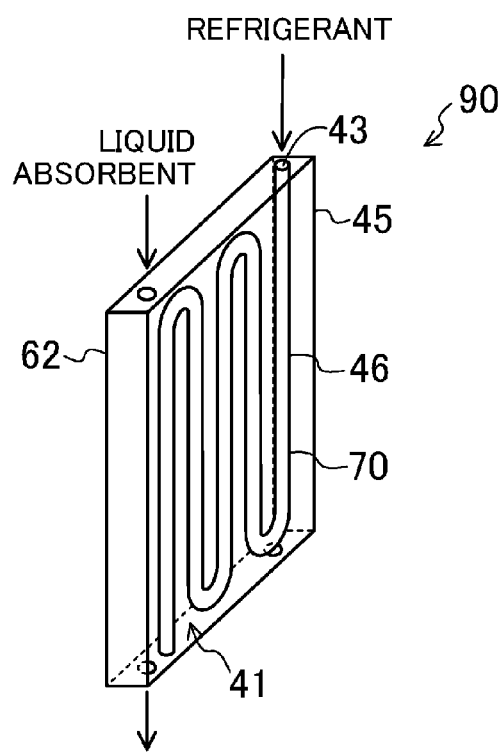

HUMIDITY CONTROL MODULE AND HUMIDITY CONTROL APPARATUS

TECHNICAL FIELD

The present invention relates to humidity control modules for controlling humidity of air using liquid absorbent, and humidity control apparatuses including the humidity control modules.

BACKGROUND ART

Conventionally, humidity control apparatuses are known, which include liquid absorbent such as a lithium chloride solution, and moisture permeable membranes not allowing the liquid absorbent to permeate but allowing only water vapor to permeate.

For example, Patent Document 1 shows a humidity control apparatus including a circuit in which liquid absorbent circulates, and a refrigerating apparatus performing refrigeration cycles (see, e.g., paragraphs [0031]-[0033] and FIG. 8 of Patent Document 1). This humidity control apparatus includes a dehumidification section and a regeneration section. In the dehumidification section, a dehumidification air passage including a fan 11 is separated from the passage of the liquid absorbent by a moisture permeable membrane 13. On the other hand, in the regeneration section, a regeneration air passage including a fan 10 is separated from the passage of the liquid absorbent by the moisture permeable membrane 13. In addition, in this humidity control apparatus, a condenser 18 of the refrigerating apparatus is disposed in the passage which allows the liquid absorbent to flow from the dehumidification section to the regeneration section. An evaporator 20 of the refrigerating apparatus is disposed in the passage which allows the liquid absorbent to flow from the regeneration section to the dehumidification section.

In the humidity control apparatus of Patent Document 1, the liquid absorbent circulates between the dehumidification section and the regeneration section. The liquid absorbent, which has absorbed the water vapor in the air in the dehumidification section, is heated in the condenser 18, and then flows into the regeneration section. In the regeneration section, the liquid absorbent releases the water vapor to the air. The liquid absorbent flowing from the regeneration section is cooled in the evaporator 20, and then flows into the dehumidification section to absorb the moisture from the air again.

Patent Document 2 shows a humidity control element 7 for dehumidifying air using a moisture permeable sheet 10 and liquid absorbent (see, e.g., paragraphs [0034], [0035], [0042], and [0051] and FIGS. 1-5 of Patent Document 2). This humidity control element 7 includes a moisture permeable element 5 and a heat source body 6. In the moisture permeable element 5, a porous member 12 is encapsulated in a bag including the moisture permeable sheet 10 on one surface, and a metal sheet 11 on the other surface. The heat source body 6 includes a pipe 15 through which refrigerant flows, and a flat plate-like fin member 16 attached to the pipe 15. In the humidity control element 7, the metal sheet 11 of the moisture permeable element 5 is attached to the fin member 16 of the heat source body 6.

In the humidity control element 7 according to Patent Document 2, when the liquid absorbent permeates the porous member 12, the water vapor, which has permeated through the moisture permeable sheet 10, is absorbed by the liquid absorbent. As a result, the air flowing outside the moisture permeable sheet 10 is dehumidified. At this time, the liquid absorbent held by the porous member 12 is cooled by the refrigerant flowing through the pipe 15.

Patent Document 3 shows an evaporative cooler utilizing a moisture permeable membrane. In this evaporative cooler, the passage of inflow air, the passage of liquid desiccant (liquid absorbent), the passage of coolant (water), and the passage of discharged air are stacked one on another. The passage of the inflow air and the passage of the liquid desiccant are separated by a moisture permeable membrane 112. The passage of the coolant and the passage of the discharged air are separated by a moisture permeable membrane 118. Furthermore, the passage of the liquid desiccant and the passage of the coolant are separated by a separation wall 114 which does not allow water vapor to permeate. The inflow air is dehumidified by the liquid desiccant. The water, which is coolant, is partially evaporated and released to the discharged air, thereby reducing the temperature of the discharged air. The liquid desiccant and the coolant exchange heat.

Patent Document 4 shows a humidity control apparatus including adsorbent such as zeolite, and a refrigerating apparatus. In an adsorption unit 4 included in the humidity control apparatus, a refrigerant pipe 21 is disposed in a mesh container 22 filled with adsorbent 23, and refrigerant flowing through the refrigerant pipe 21 heats or cools the adsorbent 23 (see, paragraphs [0029] and [0030] and FIG. 3 of the cited document 4).

CITATION LIST

Patent Document

PATENT DOCUMENT 1: Japanese Unexamined Patent Publication No. H05-146627
PATENT DOCUMENT 2: Japanese Unexamined Patent Publication No. 2003-232546
PATENT DOCUMENT 3: Japanese Translation of PCT International Application No. 2011-511244
PATENT DOCUMENT 4: Japanese Unexamined Patent Publication No. H08-189667

SUMMARY OF THE INVENTION

Technical Problem

As described above, in the humidity control apparatus shown in Patent Document 1, the liquid absorbent heated or cooled by the refrigerant in advance exchanges the moisture with the air via the moisture permeable membrane. On the other hand, in the process of absorbing the water vapor with the liquid absorbent, absorption heat is generated. In the process of regenerating the liquid absorbent, the water being liquid deprives the heat from the liquid absorbent to be gasified. Thus, in the humidity control apparatus of Patent Document 1, the temperature of the liquid absorbent gradually increases in the process of absorbing the water vapor, thereby allowing the liquid absorbent to absorb less water vapor. In this humidity control apparatus, the temperature of the liquid absorbent gradually decreases in the process of releasing the water vapor from the liquid absorbent, thereby allowing the liquid absorbent to release less water vapor. Therefore, in the conventional humidity control apparatus, in which the liquid absorbent, which has been heated or cooled in advance, exchanges the moisture with the air via the moisture permeable membrane, the sizes of the dehumidification section and the regeneration section including the moisture permeable membrane increase in order to obtain sufficient humidity control capability.

On the other hand, in the humidity control element of Patent Document 2 and the evaporative cooler of Patent Document 3, the liquid absorbent, which is to absorb the moisture in the air, is cooled by the refrigerant and the water. However, in the humidity control element of Patent Document 2, numbers of members such as the fin members and the metal sheet are interposed between the liquid absorbent and the refrigerant, thereby increasing the thermal resistance between the liquid absorbent and the refrigerant. In the evaporative cooler of Patent Document 3, only the one surface of the passage of the water, which is coolant, is in contact with the passage of the liquid absorbent, and no sufficient area is obtained for a heat transfer surface on which the water and the liquid absorbent exchange heat.

As such, in the conventional humidity control apparatuses using the liquid absorbent, a temperature change in the liquid absorbent in the process of exchanging the moisture with the air cannot be sufficiently reduced. As a result, the members for allowing the liquid absorbent to exchange the moisture with the air via the moisture permeable membrane cannot be miniaturized.

The present invention addresses the problems. It is an objective of the present invention to provide a humidity control module allowing liquid absorbent to exchange air and moisture via a moisture permeable membrane, and to miniaturize the humidity control module by reducing a temperature change in the liquid absorbent.

Solution to the Problem

A first aspect of the invention provides a humidity control module for humidifying or dehumidifying air using liquid absorbent. The module includes a partition member (45) wholly or partially formed by a moisture permeable membrane (62) not allowing the liquid absorbent to permeate but allowing water vapor to permeate, the partition member (45) separating an air passage (42) through which the air flows, from an absorbent passage (41) through which the liquid absorbent flows; and a heat transfer member (46) forming a heat medium passage (43) through which a heat medium for heating or cooling flows, and disposed in the absorbent passage (41) to allow the liquid absorbent flowing around the heat transfer member (46) to exchange heat with the heat medium.

In the humidity control module (40) according to the first aspect of the invention, the air passage (42) and the absorbent passage (41) are separated by the partition member (45). The partition member (45) is wholly or partially formed by the moisture permeable membrane (62). In this humidity control module (40), the heat transfer member (46) forming the heat medium passage (43) is disposed in the absorbent passage (41). The heat transfer member (46) allows the heat medium in the heat medium passage (43) to exchange the heat with the liquid absorbent in the absorbent passage (41). This heat transfer member (46) is surrounded by the liquid absorbent flowing through the absorbent passage (41). Thus, almost all the heat or cold of the heat medium flowing through the heat medium passage (43) is applied to the liquid absorbent.

First, in the humidity control module (40) according to the first aspect of the invention, the process of dehumidifying the air in the air passage (42) will be described. The water vapor contained in the air in the air passage (42) partially permeates the moisture permeable membrane (62) to be absorbed by the liquid absorbent. In the process of absorbing the water vapor with the liquid absorbent, absorption heat is generated. At this time, when the heat medium for cooling flows through the heat medium passage (43), the liquid absorbent flowing through the absorbent passage (41) is cooled by the heat medium in the heat medium passage (43). As described above, the heat transfer member (46) is surrounded by the liquid absorbent flowing through the absorbent passage (41). Thus, almost all the heat absorbed by the heat medium while passing through the heat medium passage (43) is the heat released from the liquid absorbent. This reduces an increase in the temperature of the liquid absorbent flowing through the absorbent passage (41), even if the absorption heat is generated in the process of absorbing the water vapor with the liquid absorbent.

Next, in the humidity control module (40) according to the first aspect of the invention, the process of humidifying the air in the air passage (42) will be described. When the heat medium for heating flows through the heat medium passage (43), the liquid absorbent flowing through the absorbent passage (41) is heated by the heat medium in the heat medium passage (43). Part of the water contained in the heated liquid absorbent deprives heat from surroundings to be gasified and, as water vapor, permeate the moisture permeable membrane (62). The water vapor, which has permeated through the moisture permeable membrane (62), is applied to the air flowing through the air passage (42). As described above, the heat transfer member (46) is surrounded by the liquid absorbent flowing through the absorbent passage (41). Thus, almost all the heat released by the heat medium while passing through the heat medium passage (43) is applied to the liquid absorbent. This reduces a decrease in the temperature of the liquid absorbent flowing through the absorbent passage (41), even if water contained in the liquid absorbent deprives heat from the surroundings while being gasified.

According to a second aspect of the invention, in the first aspect of the invention, in the partition member (45), the moisture permeable membrane (62) includes a plurality of plane-like moisture permeable membranes (62) arranged at predetermined intervals to face one another. The air passage (42) and the absorbent passage (41) include a plurality of air passages (42), and a plurality of absorbent passages (41), respectively. The air passages (42) and the absorbent passages (41) are alternately formed along alignment of the moisture permeable membranes (62).

In the second aspect of the invention, the plurality of plane-like moisture permeable membranes (62) are provided in the partition member (45). The plurality of moisture permeable membranes (62) are arranged at the predetermined intervals. One of the air passages (42) or the absorbent passages (41) is formed between an adjacent pair of the moisture permeable membranes (62). That is, in the humidity control module (40) according to the present invention, the air passage (42) and the absorbent passage (41) are adjacent to one another with one of the plane-like moisture permeable membranes (62) interposed therebetween.

According to a third aspect of the invention, in the second aspect of the invention, the heat transfer member (46) includes a heat transfer tube (70) disposed between a pair of the moisture permeable membranes (62), which are adjacent with one of the absorbent passages (41) interposed therebetween, the heat medium flowing through the heat transfer tube (70).

The heat transfer member (46) according to the third aspect of the invention includes the heat transfer tube (70). The heat transfer tube (70) forms the heat medium passage (43) through which the heat medium flows. The heat transfer tube (70) is located between the adjacent pair of the moisture permeable membranes (62). The liquid absorbent flowing through the absorbent passage (41) exchanges the moisture with the air in the air passage (42) via one of the moisture permeable membranes (62), which is adjacent to the absorbent passage (41). At this time, the liquid absorbent flowing through the absorbent passage (41) is heated or cooled by the heat medium flowing through the heat transfer tube (70).

According to a fourth aspect of the invention, in the third aspect of the invention, the heat transfer member (46) includes the heat transfer tube (70) including a plurality of heat transfer tubes (70), a first header (71) connected to one end of each of the heat transfer tubes (70), and a second header (72) connected to another end of each of the heat transfer tubes (70).

The heat transfer member (46) according to the fourth aspect of the invention includes the plurality of heat transfer tubes (70). Each of the heat transfer tubes (70) is disposed in the absorbent passage (41) interposed between the moisture permeable membranes (62) at both sides. The one end of each heat transfer tube (70) is connected to the first header (71). The other end is connected to the second header (72). For example, when the heat medium flows from the first header (71) to the second header (72), the heat medium flowing into the first header (71) is divided into the plurality of heat transfer tubes (70), and then comes together at the second header (72).

According to a fifth aspect of the invention, in the fourth aspect of the invention, the heat transfer member (46) includes a plurality of heat transfer members (46). In each of the heat transfer members (46), the plurality of heat transfer tubes (70) are aligned in parallel to one another. The plurality of heat transfer members (46) face one another. In an adjacent pair of the heat transfer members (46), the heat transfer tubes (70) of one of the heat transfer members (46) and the heat transfer tubes (70) of the other one of the heat transfer members (46) are disposed in different ones of the absorbent passages (41).

In the fifth aspect of the invention, each pair of the plurality of the heat transfer members (46) faces one another. The heat transfer tube (70) provided in the one of the adjacent pair of the heat transfer members (46) is disposed in an absorbent passage (41) different from that of the heat transfer tube (70) provided in the other one of the adjacent pair of the heat transfer members (46). Thus, in the humidity control module (40) according to the present invention, some of the heat transfer tubes (70) of the heat transfer members (46) can be disposed some of the absorbent passages (41), and the heat transfer tubes (70) of the other heat transfer members (46) are disposed in the rest of the absorbent passages (41).

According to a sixth aspect of the invention, in the third or fourth aspect of the invention, each of the heat transfer tubes (70) is a flat tube having an internal space divided into a plurality of channels.

In the sixth aspect of the invention, each of the heat transfer tubes (70) is the flat tube. In the heat transfer members (46) according to the present invention, the passages of flat tubes being the heat transfer tubes (70) form the heat medium passages (43).

According to a seventh aspect of the invention, in the first aspect of the invention, the heat transfer member (46) includes a heat transfer tube (70) through which the heat medium flows. The partition member (45) surrounds the heat transfer tube (70). An inside of the partition member (45) serves as the absorbent passage (41), and an outside of the partition member (45) serves as the air passage (42).

In the seventh aspect of the invention, the heat transfer member (46) includes the heat transfer tube (70). In the present invention, the inside of the partition member (45) serves as the absorbent passage (41) through which the liquid absorbent flows. The heat transfer tube (70) is surrounded by the partition member (45). Thus, the heat transfer tube (70) is positioned in the absorbent passage (41) inside the partition member (45). The outside of the partition member (45) serves as the air passage (42) through which the air flows. The number of the heat transfer tube(s) (70) surrounded by a single partition member (45) may be one or more.

According to an eighth aspect of the invention, in the seventh aspect of the invention, the heat transfer tube (70) is in a winding form. The partition member (45) is in a form winding along the heat transfer tube (70).

In the eighth aspect of the invention, the heat transfer tube (70) of the heat transfer member (46), and the partition member (45) surrounding the heat transfer tube (70) are both in the winding forms.

According to a ninth aspect of the invention, in the seventh aspect of the invention, the partition member (45) is formed like a pipe extending along the heat transfer tube (70).

In the ninth aspect of the invention, the heat transfer tube (70) of the heat transfer member (46) and the partition member (45) surrounding the heat transfer tube (70) form a double pipe.

A tenth aspect of the invention provides a humidity control apparatus, which includes the humidity control module (40) according to any one of the first to ninth aspects, an absorbent circuit (30) connected to the absorbent passage (41) of the humidity control module (40) to supply the liquid absorbent to the absorbent passage (41); a heat medium circuit (35) connected to the heat medium passage (43) of the humidity control module (40) to supply the heat medium for heating or cooling to the heat medium passage (43); and fans (27, 28) for supplying the air to the air passage (42) of the humidity control module (40). The humidity control apparatus humidifies or dehumidifies the air flowing through the air passage (42) of the humidity control module (40).

In the humidity control apparatus (10) of the tenth aspect of the invention includes the humidity control module (40) of any one of the first to ninth aspects. The absorbent circuit (30) is connected to the absorbent passage (41) of the humidity control module (40) to supply the liquid absorbent to the absorbent passage (41). The heat medium circuit (35) is connected to the heat medium passage (43) of the humidity control module (40) to supply the heat medium to the heat medium passage (43).

In the humidity control apparatus (10) according to the tenth aspect of the invention, when the heat medium circuit (35) supplies the heat medium for heating to the heat medium passage (43) of the humidity control module (40), the air flowing through the air passage (42) of the humidity control module (40) is humidified. That is, in the humidity control module (40), the liquid absorbent flowing through the absorbent passage (41) is heated by the heat medium, and the water vapor released from the liquid absorbent is applied to the air in the air passage (42). On the other hand, when the heat medium circuit (35) supplies the heat medium for cooling to the heat medium passage (43) of the humidity control module (40), the air flowing through the air passage (42) of the humidity control module (40) is dehumidified. That is, in the humidity control module (40), the water vapor in the air is absorbed by the liquid absorbent, and the absorption heat generated at this time is absorbed by the heat medium for cooling of the heat medium passage (43).

Advantages of the Invention

In the humidity control module (40) according to the present invention, the heat transfer member (46) is disposed in the absorbent passage (41). This heat transfer member (46)

forms the heat medium passage (43). The heat transfer member (46) is disposed in the absorbent passage (41) and surrounded by the liquid absorbent. Thus, almost all the heat released from the heat medium for heating flowing through the heat medium passage (43) is applied to the liquid absorbent in the absorbent passage (41). Almost all the heat absorbed by the heat medium for cooling flowing through the heat medium passage (43) is the heat absorbed from the liquid absorbent in the absorbent passage (41). Thus, the present invention reduces a temperature change in the liquid absorbent when the liquid absorbent exchanges the moisture with the air. This results in miniaturization of the humidity control module (40). Furthermore, the present invention utilizes the heat of the heat medium for heating without waste to heat the liquid absorbent, and utilizes the cold of the heat medium for cooling without waste to cool the liquid absorbent. This reduces energy required to allow the liquid absorbent to absorb and release the moisture in the humidity control module (40).

In particular, in the third aspect of the invention, the heat transfer tube (70) of the heat transfer member (46) is disposed between the pair of the moisture permeable membranes (62), which are adjacent to one another with one of the absorbent passages (41) interposed therebetween. Thus, in this invention, the heat transfer tube (70) is disposed near the moisture permeable membranes (62), where the liquid absorbent exchanges the moisture with the air. The liquid absorbent exchanging the moisture with the air reliably exchanges heat with the heat medium flowing through the heat transfer tube (70).

In the seventh aspect of the invention, the heat transfer tube (70) is surrounded by the partition member (45), and the inside of the partition member (45) serves as the absorbent passage (41), which allows the liquid absorbent to flow. That is, the absorbent passage (41) is formed between the heat transfer tube (70) of the heat transfer member (46) and the partition member (45) surrounding the heat transfer tube (70). Furthermore, in the present invention, the partition member (45) is wholly or partially formed by the moisture permeable membrane (62). Thus, in this invention, the heat transfer tube (70) is disposed near the moisture permeable membranes (62), where the liquid absorbent exchanges the moisture with the air. The liquid absorbent exchanging the moisture with the air reliably exchanges heat with the heat medium flowing through the heat transfer tubes (70).

BRIEF DESCRIPTION OF THE DRAWINGS

FIG. 7(A) is a schematic perspective view.

FIG. 7(B) is a schematic cross-sectional view taken along the horizontal cross-section.

FIG. 10 illustrate the humidity control module according to the second embodiment. FIG. 10(A) is a schematic front view. FIG. 10(B) is a schematic cross-sectional view taken along the line X-X.

FIG. 11(A) is an exploded schematic perspective view. FIG. 11(B) is a schematic top view.

FIG. 16(A) is a schematic perspective view of the double pipe. FIG. 16(B) is a schematic perspective view of a heat transfer tube.

FIG. 17 is a cross-sectional view illustrating a manufacturing process of the double pipe according to the first variation of the third embodiment.

FIG. 18 is a cross-sectional view illustrating a manufacturing process of a double pipe according to a second variation of the third embodiment.

FIG. 20 illustrate the configuration of a double pipe according to a fourth variation of the third embodiment. FIG. 20(A) is a schematic perspective view of the double pipe. FIG. 20(B) is a schematic perspective view of a heat transfer tube.

FIG. 21 illustrate a humidity control module according to a fourth embodiment. FIG. 21(A) is a schematic perspective view of the humidity control module. FIG. 21(B) is a schematic perspective view of a film unit.

FIG. 22 illustrate a humidity control module according to a variation of the fourth embodiment. FIG. 22(A) is a schematic perspective view of the humidity control module. FIG. 22(B) is a schematic perspective view of a film unit.

DESCRIPTION OF EMBODIMENTS

Figure 1:
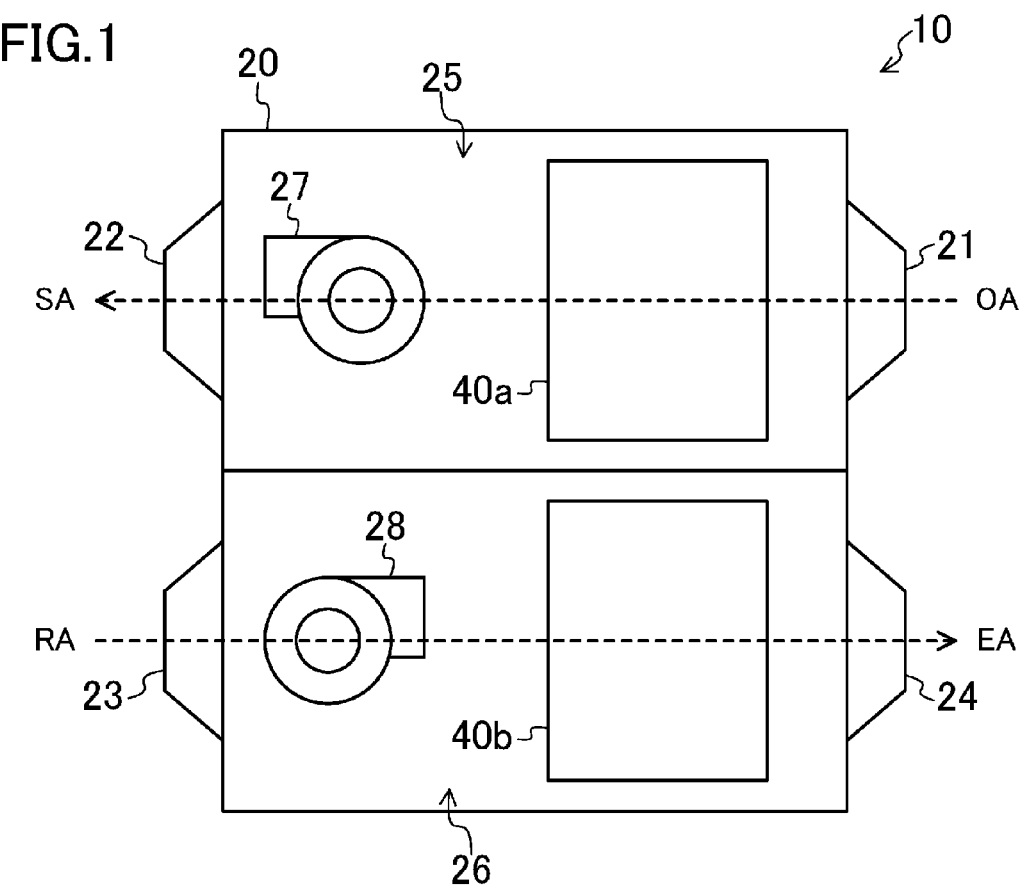
FIG. 1 is a top view illustrating the schematic configuration of a humidity control apparatus according to a first embodiment.

The embodiments of the present invention will be described hereinafter in detail with reference to the drawings.

First Embodiment of Invention

A first embodiment of the present invention will be described. This embodiment uses a humidity control apparatus (10) humidifying and dehumidifying air.

Configuration of Humidity Control Apparatus

The humidity control apparatus (10) according to this embodiment will be described with reference to FIGS. 1 and 2.

The humidity control apparatus (10) according to this embodiment includes a casing (20). This casing (20) contains an absorbent circuit (30), a refrigerant circuit (35), a supply fan (27), and a discharge fan (28).

As shown in FIG. 1, the casing (20) is formed like a rectangular parallelepiped box. In the casing (20), an outdoor air suction port (21) and a discharge port (24) are formed on one end surface, and an indoor air suction port (23) and a supply port (22) are formed on the other end surface. The internal space of the casing (20) is divided into a supply passage (25), and a discharge passage (26). The supply passage (25) communicates with the outdoor air suction port (21) and the supply port (22). The supply fan (27) and a supply-side module (40a), which is a first humidity control module, are disposed in the supply passage (25). On the other hand, the discharge passage (26) communicates with the indoor air suction port (23) and the discharge port (24). The discharge fan (28) and a discharge-side module (40b), which is a second humidity control module, are arranged in the discharge passage (26).

Figure 2:
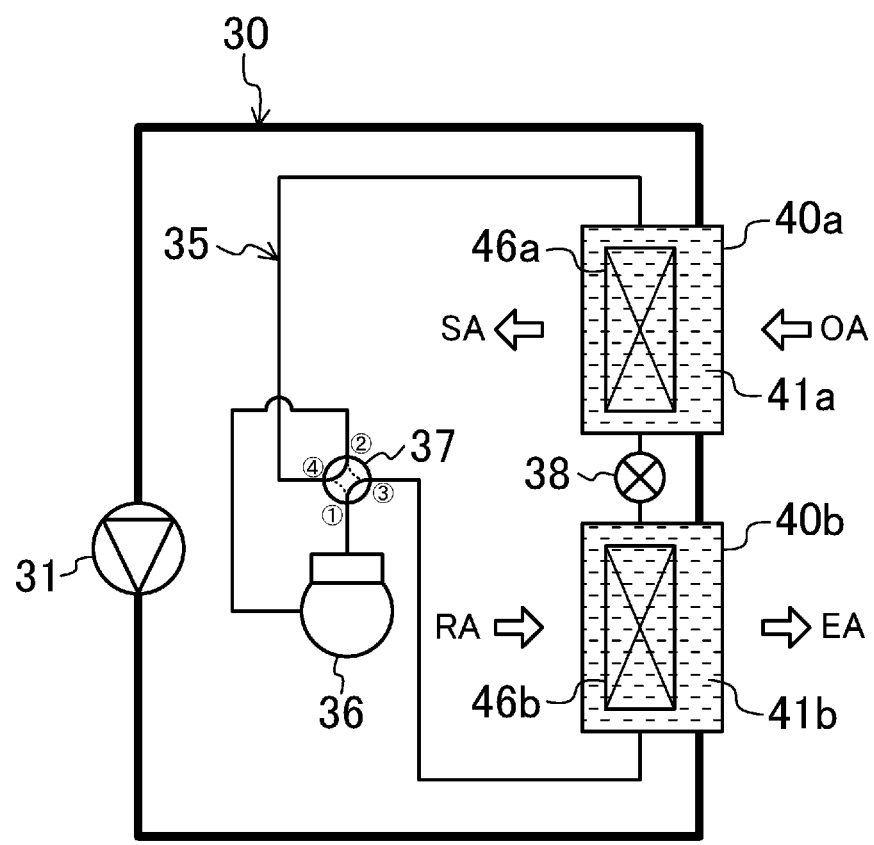
FIG. 2 is a circuit diagram illustrating the configurations of an absorbent circuit and a refrigerant circuit provided in the humidity control apparatus according to the first embodiment.

As shown in FIG. 2, the absorbent circuit (30) is a closed circuit connecting the supply-side module (40a), the discharge-side module (40b) and a pump (31) together. In this absorbent circuit (30), the discharge side of the pump (31) is connected to the inlet of an absorbent passage (41b) of the discharge-side module (40b), the outlet of the absorbent passage (41b) of the discharge-side module (40b) is connected to the inlet of an absorbent passage (41a) of the supply-side module (40a), and the outlet of the absorbent passage (41a) of the supply-side module (40a) is connected to the suction side of the pump (31). The absorbent circuit (30) is filled with a lithium chloride solution as liquid absorbent.

The refrigerant circuit (35) is a closed circuit connecting a compressor (36), a four-way valve (37), an expansion valve (38), the supply-side module (40a), and the discharge-side module (40b) together. In this refrigerant circuit (35), the discharge side of the compressor (36) is connected to a first port of the four-way valve (37), and the suction side of the compressor (36) is connected to a second port of the four-way valve (37). In this refrigerant circuit (35), a heat transfer member (46b) of the discharge-side module (40b), the expansion valve (38), and a heat transfer member (46a) of the supply-side module (40a) are arranged in this order from a third port to a fourth port of the four-way valve (37). The refrigerant circuit (35) performs vapor compression refrigeration cycles by circulating the filling refrigerant. The refrigerant circuit (35) supplies the refrigerant as a heat medium to the supply-side module (40a) and the discharge-side module (40b).

The four-way valve (37) is switchable between a first position (i.e., the position indicated by the solid line in FIG. 2), and a second position (i.e., the position indicated by the broken line in the figure). When the four-way valve (37) is in the first position, the first port communicates with the third port, and the second port communicates with the fourth port. On the other hand, when the four-way valve (37) is in the second position, the first port communicates with the fourth port, and the second port communicates with the third port.

Configuration of Humidity Control Module

Each of the supply-side module (40a) and the discharge-side module (40b) is a humidity control module (40). The humidity control module (40) will be described below with reference to FIGS. 3-7 as appropriate.

The humidity control module (40) is for controlling the humidity of air using liquid absorbent. This humidity control module (40) includes a single outer case (50), a plurality of inner members (60), and two heat transfer members (46). The inner members (60) and the heat transfer members (46) are contained in the outer case (50). The outer case (50) and the inner members (60) form a partition member (45) separating air passages (42) through which the air flows, from absorbent passages (41) through which the liquid absorbent flows.

Figure 3:
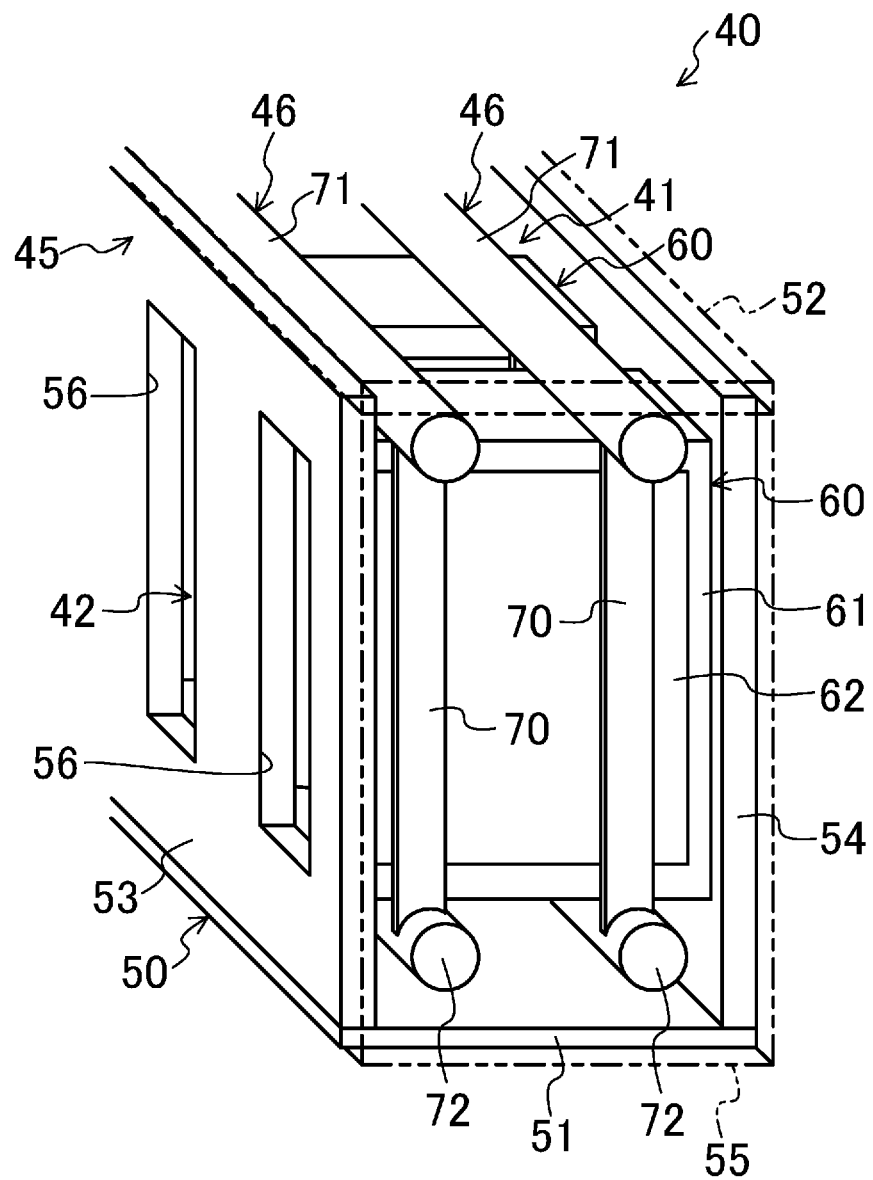
FIG. 3 is a schematic perspective view illustrating a humidity control module according to the first embodiment, which is partially not shown.
Figure 4:
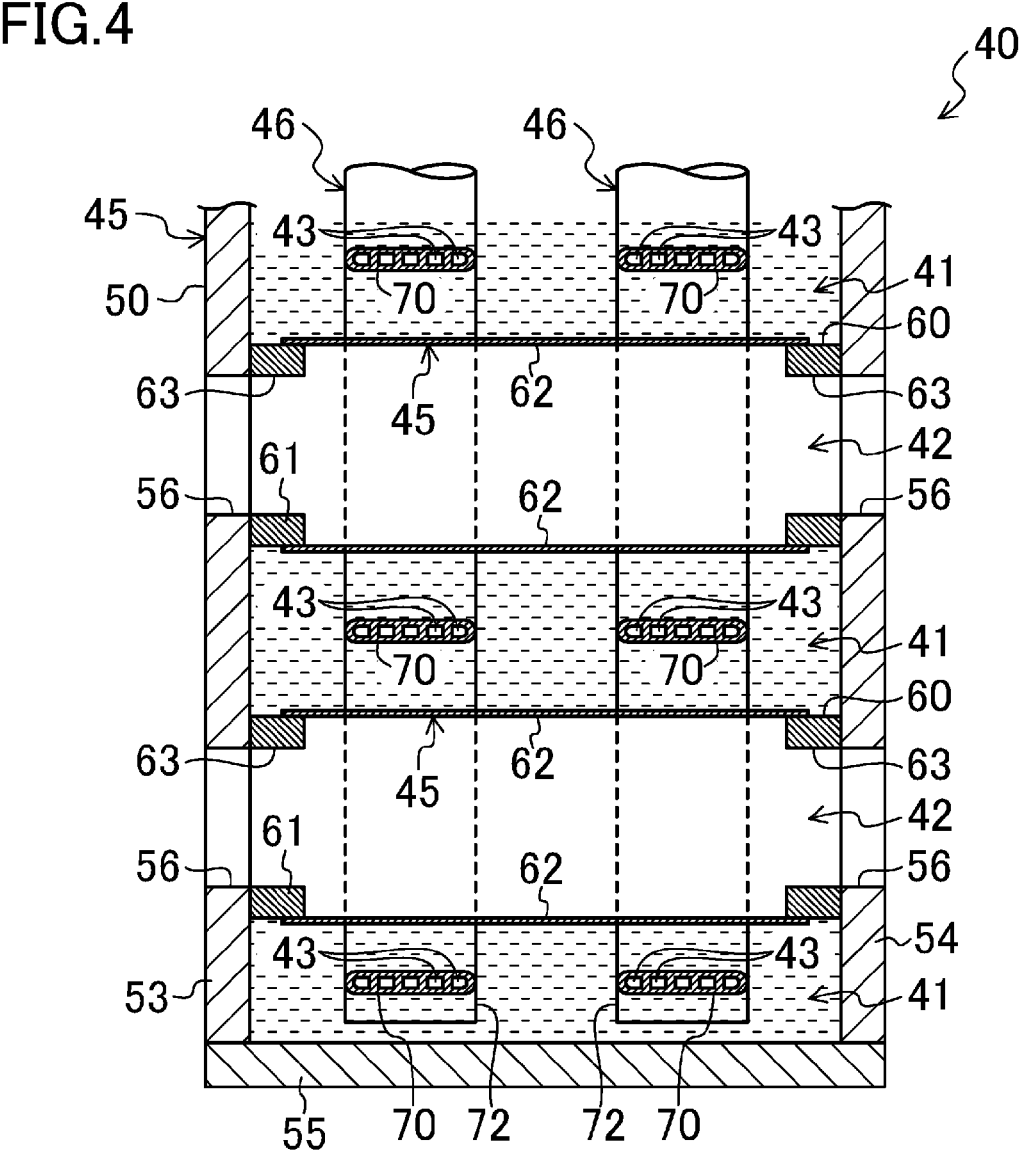
FIG. 4 is a schematic cross-sectional view taken along the horizontal cross-section of the humidity control module according to the first embodiment.

As shown in FIG. 3, the outer case (50) is formed like a hollow rectangular parallelepiped, and includes a bottom plate (51), a top plate (52), a pair of side plates (53, 54), and a pair of end plates (55). FIG. 3 does not show the top plate (52) and the front end plate (55). A plurality of vent holes (56) are formed in the side plates (53, 54) to penetrate the side plates (53, 54) along the thicknesses. The vent holes (56) are in vertically long rectangle forms. As shown in FIG. 4 as well, the plurality of vent holes (56) are aligned at regular intervals along the lengths of the side plates (53, 54).

Figure 5:
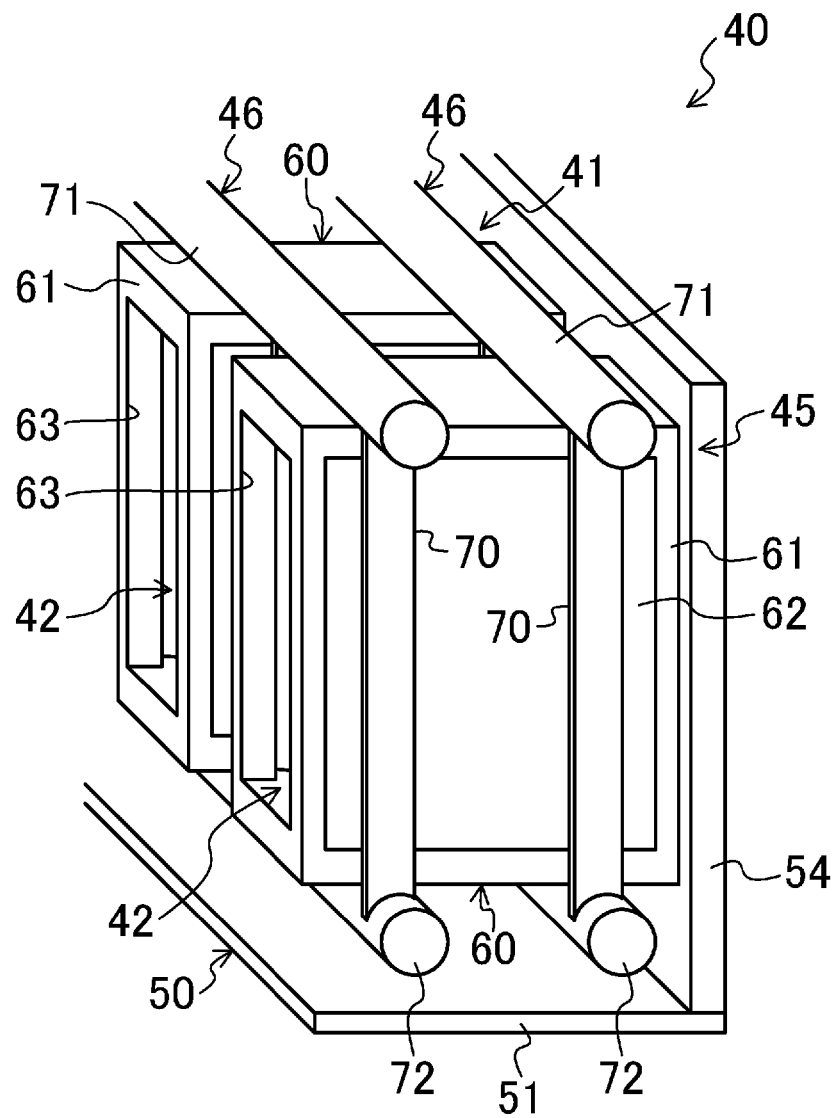
FIG. 5 is a schematic perspective view of the humidity control module according to the first embodiment, which is partially not shown.
Figure 7:
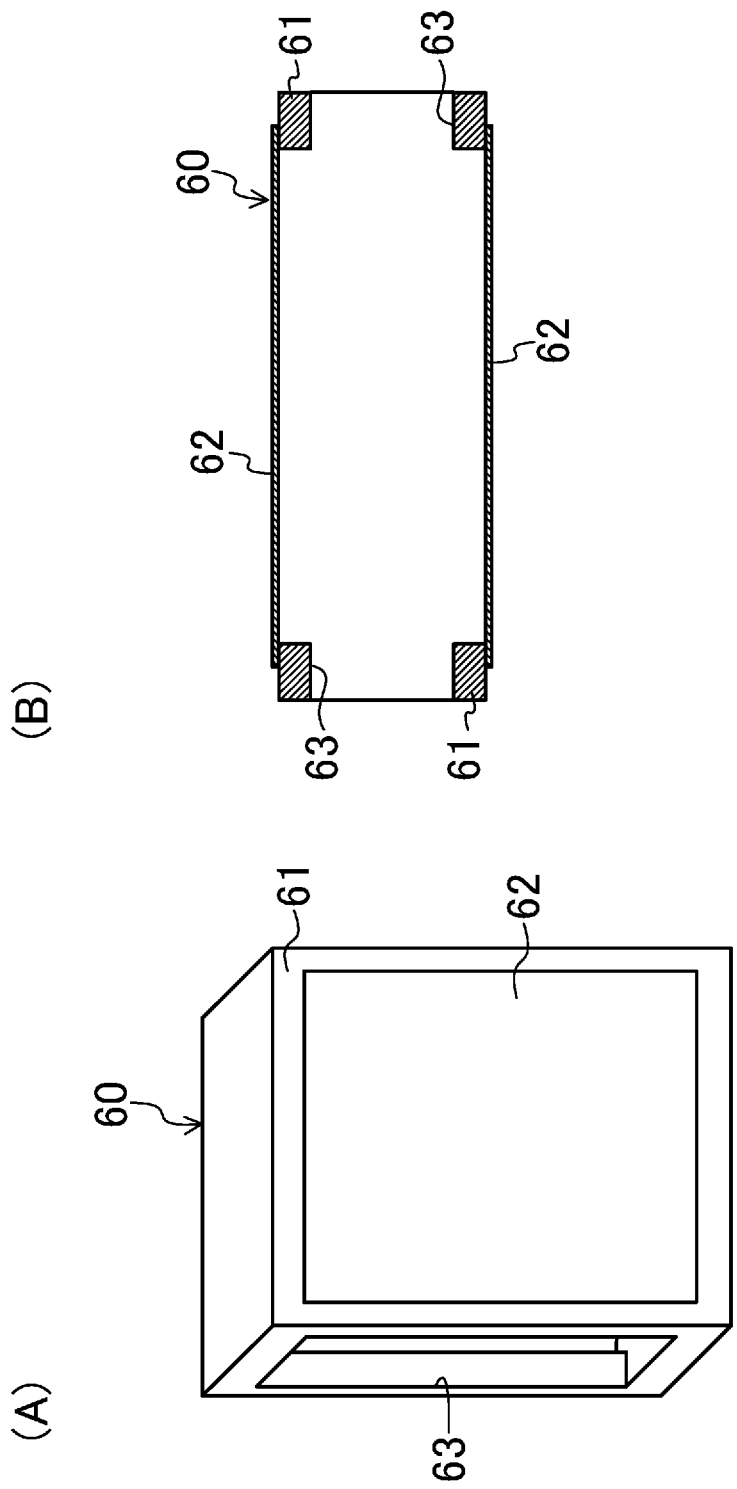
FIG. 7 illustrate an inner member provided in the humidity control module according to the first embodiment.

As shown in FIGS. 5 and 7, each inner member (60) is formed like a hollow rectangular parallelepiped with open ends. This inner member (60) includes a support frame (61) and moisture permeable membranes (62). The upper and lower surfaces of the support frame (61) are formed like plates. That is, the upper and lower surfaces of the support frame (61) are closed. The moisture permeable membranes (62) are provided to cover the side surfaces of the support frame (61). Thus, the moisture permeable membranes (62) provided on each inner member (60) are formed like planes. The moisture permeable membranes (62) are films, which do not allow liquid absorbent to permeate but allows water vapor to permeate. The moisture permeable membranes (62) may be, for example, hydrophobic porous membranes made of fluorine resin such as polytetrafluoroethylene (PTFE) and tetrafluoroethylene resin.

The outer case (50) contains the same number of the inner members (60) as the pairs of the vent holes (56) formed in the side plates (53, 54). The inner members (60) are aligned inside the outer case (50) along the length of the outer case (50), with the moisture permeable membranes (62) facing one another, which cover the respective side surfaces.

As shown in FIG. 4, openings (63) of the end surfaces of the inner members (60) have the same forms and sizes as the vent holes (56) of the side plates (53, 54) of the outer case (50). The inner members (60) are fixed to the outer case (50) such that the openings (63) overlap the vent holes (56) of the side plates (53, 54). That is, in FIG. 4, the left end surfaces of the support frames (61) of the inner members (60) are attached to the peripheral edges of the vent holes (56) on the inner surface of the side plate (53) disposed on the left. In the same figure, the right end surfaces of the support frames (61) of the inner members (60) are attached to the peripheral edges of the vent holes (56) on the inner surface of the side plate (54) disposed on the right.

As shown in FIG. 4, the inner spaces of the inner members (60) communicate with the outside via the vent holes (56) of the outer case (50) serve as air passages (42) through which the air flows. The air passages (42) allow the air flowing through the supply passage (25) or the discharge passage (26) of the humidity control apparatus (10) to pass. The spaces outside the inner members (60) and inside the outer case (50) serve as absorbent passages (41) through which the liquid absorbent flows. The absorbent passages (41) allow the liquid absorbent circulating in the absorbent circuit (30) to pass. Thus, the front surfaces of the moisture permeable membranes (62) are in contact with the air flowing through the air passages (42), and the back surfaces are in contact with the liquid absorbent flowing through the absorbent circuit (30).

As described above, the plurality of inner members (60) contained in the outer case (50) are aligned with the moisture permeable membranes (62) facing one another, which cover the side surfaces. Thus, in the partition member (45) according to this embodiment, which is formed by the outer case (50) and the inner members (60), the plane moisture permeable membranes (62) are aligned at regular intervals to face one another, and the air passages (42) and the absorbent passages (41) are alternately formed along the alignment of the moisture permeable membranes (62) (i.e., along the length of the outer case (50) in this embodiment). The portions of the absorbent passages (41), each of which is interposed between a pair of the moisture permeable membranes (62) at the both sides, communicate with one another via the upper and lower sides of the inner members (60).

Figure 6:
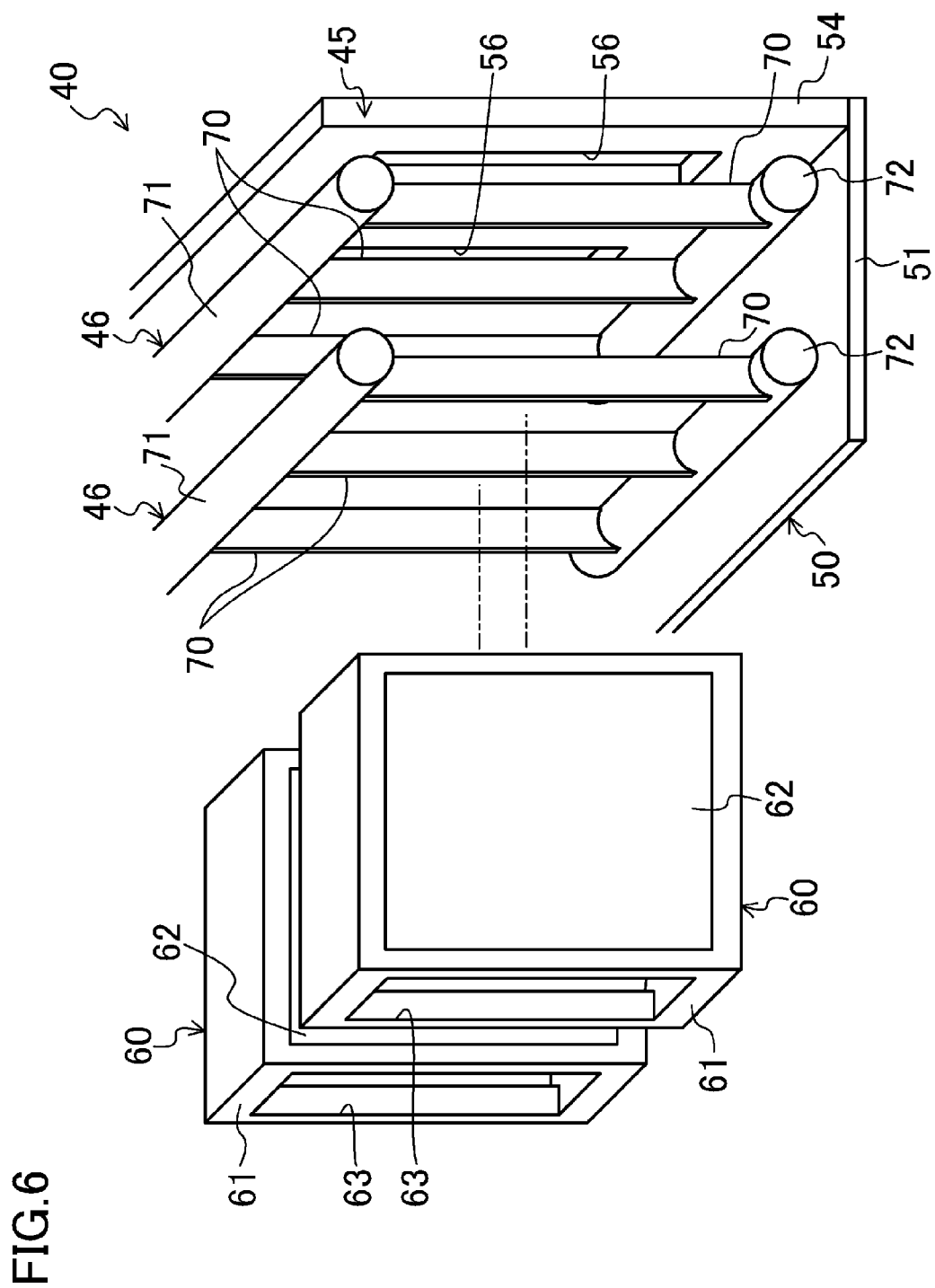
FIG. 6 is an exploded schematic perspective view of the humidity control module according to the first embodiment, which is partially not shown.

As shown in FIG. 6, each heat transfer member (46) includes a plurality of heat transfer tubes (70), a single first header (71), and a single second header (72).

The heat transfer tubes (70) are aluminum flat tubes (see FIG. 4). Specifically, the heat transfer tubes (70) have flat ellipse cross-sections. The internal space of each heat transfer tube (70) is divided into a plurality of channels. The passages formed in each heat transfer tube (70) are heat medium passages (43) through which the refrigerant of the refrigerant circuit (35) flows. In each heat transfer member (46), the plurality of heat transfer tubes (70) are aligned at regular intervals with the flat surfaces facing one another. The axes of the heat transfer tubes (70) extend vertically.

The first headers (71) and the second headers (72) are formed like circular pipes with closed ends. The first headers (71) are attached to the upper ends of the aligned heat transfer tubes (70). The second headers (72) are attached to the lower ends of the aligned heat transfer tubes (70). The internal spaces of the first headers (71) and the second headers (72) communicate with the passages formed inside the heat transfer tubes (70) to form the heat medium passages (43) together with the passages inside the heat transfer tubes (70).

In the outer case (50), one of the two heat transfer members (46) is disposed close to the first side plate (53) and the other is disposed close to the second side plate (54). One of the heat transfer tubes (70) of each heat transfer member (46) is disposed between each adjacent pair of the inner members (60). Thus, in the humidity control module (40) according to this embodiment, one of the heat transfer tubes (70) of one of the heat transfer members (46) and one of the heat transfer tubes (70) of the other heat transfer members (46) are disposed between each adjacent pair of the inner members (60). As described above, the spaces between adjacent pairs of the inner members (60) serve as absorbent passages (41). Thus, the heat transfer tubes (70) of the heat transfer members (46) are disposed in the absorbent passages (41), and the surfaces of the heat transfer tubes (70) are in contact with the liquid absorbent flowing through the absorbent passages (41). That is, the heat transfer tubes (70) of the heat transfer members (46) are surrounded by the liquid absorbent flowing through the absorbent passages (41).

The heat transfer members (46) of the humidity control module (40) are connected to the refrigerant circuit (35). In the supply-side module (40a), which is the humidity control module (40), the first headers (71) of the heat transfer members (46) are connected to the fourth port of the four-way valve (37), and the second headers (72) of the heat transfer members (46) are connected to the expansion valve (38). On the other hand, in the discharge-side module (40b), which is the humidity control module (40), the first headers (71) of the heat transfer members (46) are connected to the third port of the four-way valve (37), and the second headers (72) of the heat transfer members (46) are connected to the expansion valve (38).

Driving Operation of Humidity Control Apparatus

The driving operation of the humidity control apparatus (10) will be described. The humidity control apparatus (10) selectively executes dehumidifying operation dehumidifying the air supplied indoors, and humidifying operation humidifying the air supplied indoors.

Dehumidifying Operation

The dehumidifying operation of the humidity control apparatus (10) will be described with reference to FIG. 2.

In the dehumidifying operation, the four-way valve (37) of the refrigerant circuit (35) is set to the first position (i.e., the position indicated by the solid line in FIG. 2). In the dehumidifying operation, the compressor (36) operates, and the opening degree of the expansion valve (38) is controlled as appropriate. In the refrigerant circuit (35) during the dehumidifying operation, the refrigerant circulates to perform vapor compression refrigeration cycles. In the refrigerant circuit (35) during the dehumidifying operation, the heat transfer member (46b) of the discharge-side module (40b) serves as a condenser, and the heat transfer member (46a) of the supply-side module (40a) serves as an evaporator.

The flow of the refrigerant in the refrigerant circuit (35) will be described in detail. High-temperature high-pressure gas refrigerant, which has been discharged from the compressor (36), passes through the four-way valve (37) to be supplied as a heat medium for heating to the discharge-side module (40b). The refrigerant, which has flowed into the heat transfer member (46b) of the discharge-side module (40b), releases heat to the liquid absorbent passing through the absorbent passage (41b) to condense and then flow out of the discharge-side module (40b). The pressure of the refrigerant, which has flowed out of the discharge-side module (40b), is reduced when the refrigerant passes through the expansion valve (38), and then the refrigerant becomes low-pressure gas-liquid two-phase refrigerant to be supplied as a heat medium for cooling to the supply-side module (40a). The refrigerant, which has flowed into the heat transfer member (46a) of the supply-side module (40a), absorbs heat from the liquid absorbent flowing through the absorbent passage (41a) to be evaporated and then flow out of the supply-side module (40a). The refrigerant, which has flowed out of the supply-side module (40a), passes through the four-way valve (37) to be sucked by the compressor (36). The compressor (36) compresses and then discharges the sucked refrigerant.

In the dehumidifying operation, the pump (31) of the absorbent circuit (30) operates to allow the liquid absorbent to circulate in the absorbent circuit (30).

The liquid absorbent discharged from the pump (31) flows into the absorbent passages (41b) of the discharge-side module (40b). This liquid absorbent, which has flowed into the absorbent passages (41b), is heated by the refrigerant flowing through the heat transfer member (46b). On the other hand, the discharge air (i.e., the indoor air to be discharged outdoors) flows through the air passages (42) of the discharge-side module (40b). In the discharge-side module (40b), part of the water contained in the liquid absorbent becomes water vapor to permeate the moisture permeable membranes (62), and is then applied to the discharge air flowing through the air passages (42). The water vapor applied to the discharge air is discharged outdoors together with the discharge air. As such, in the discharge-side module (40b), the part of the water contained in the liquid absorbent in the absorbent passages (41b) permeates the moisture permeable membranes (62) to be applied to the discharge air. Thus, in the discharge-side module (40b), the concentration of the liquid absorbent gradually increases while the liquid absorbent passes through the absorbent passages (41b).

The high concentration liquid absorbent, which has flowed out of the discharge-side module (40b), flows into the absorbent passages (41a) of the supply-side module (40a). This liquid absorbent, which has flowed into the absorbent passages (41a), is cooled by the refrigerant flowing through the heat transfer member (46a). On the other hand, the supply air (i.e., the outdoor air to be supplied indoors) flows through the air passages (42) of the supply-side module (40a). In the supply-side module (40a), the water vapor contained in the supply air permeates the moisture permeable membranes (62) to be absorbed by the liquid absorbent flowing through the absorbent passages (41a). The supply air dehumidified while passing through the air passages (42) of the supply-side module (40a) is then supplied indoors. As such, in the supply-side module (40a), part of the water vapor contained in the supply air of the air passages (42) permeates the moisture permeable membranes (62) to be absorbed by the liquid absorbent. Thus, in the supply-side module (40a), the concentration of the liquid absorbent gradually decreases, while the liquid absorbent passes through the absorbent passages (41a). The low concentration liquid absorbent, which has flowed out of the supply-side module (40a), is sucked by the pump (31), and sent out to the discharge-side module (40b).

Humidifying Operation

The humidifying operation of the humidity control apparatus (10) will be described with reference to FIG. 2.

In humidifying operation, the four-way valve (37) of the refrigerant circuit (35) is set to the second position (i.e., the position indicated by the broken line in FIG. 2). In the humidifying operation, the compressor (36) operates, and the opening degree of the expansion valve (38) is controlled as appropriate. In the refrigerant circuit (35) during the humidifying operation, the refrigerant circulates to perform vapor compression refrigeration cycles. In the refrigerant circuit (35) during the humidifying operation, the heat transfer member (46a) of the supply-side module (40a) serves as a condenser, and the heat transfer member (46b) of the discharge-side module (40b) serves as an evaporator.

The flow of the refrigerant in the refrigerant circuit (35) will be described in detail. High-temperature high-pressure gas refrigerant, which has been discharged from the compressor (36), passes through the four-way valve (37) to be supplied as the heat medium for heating from the supply-side module (40a). The refrigerant, which has flowed into the heat transfer member (46a) of the supply-side module (40a), releases heat to the liquid absorbent passing through the absorbent passages (41a) to condense and then flow out of the supply-side module (40a). The pressure of the refrigerant, which flowed out of the supply-side module (40a), is reduced when refrigerant passes through the expansion valve (38), and then the refrigerant becomes low-pressure gas-liquid two-phase refrigerant to be supplied as a heat medium for cooling to the discharge-side module (40b). The refrigerant, which has flowed into the heat transfer member (46b) of the discharge-side module (40b), absorbs heat from the liquid absorbent passing through the absorbent passages (41b) to be evaporated and then flow out of the discharge-side module (40b). The refrigerant, which has flowed out of the discharge-side module (40b), passes through the four-way valve (37) to be sucked by the compressor (36). The compressor (36) compresses and then discharges the sucked refrigerant.

In the humidifying operation, the pump (31) of the absorbent circuit (30) operates to allow the liquid absorbent to circulate in the absorbent circuit (30).

The liquid absorbent discharged from the pump (31) flows into the absorbent passages (41b) of the discharge-side module (40b). This liquid absorbent, which has flowed into the absorbent passages (41b), is cooled by the refrigerant flowing through the heat transfer member (46b). On the other hand, the discharge air (i.e., the indoor air to be discharged outdoors) flows through the air passages (42) of the discharge-side module (40b). In the discharge-side module (40b), the water vapor contained in the discharge air permeates the moisture permeable membranes (62) to be absorbed by the liquid absorbent passing through the absorbent passages (41b). The discharge air deprived of the water vapor is then discharged outdoors. As such, in the discharge-side module (40b), the part of the water vapor contained in the discharge air in the air passages (42) permeates the moisture permeable membranes (62) to be absorbed by the liquid absorbent. Thus, in the discharge-side module (40b), the concentration of the liquid absorbent gradually decreases, while the liquid absorbent passes through the absorbent passages (41b).

The low concentration liquid absorbent, which has flowed out of the discharge-side module (40b), flows into the absorbent passages (41a) of the supply-side module (40a). This liquid absorbent, which has flowed into the absorbent passages (41a), is heated by the refrigerant flowing through the heat transfer member (46a). On the other hand, the supply air (i.e., the outdoor air to be supplied indoors) flows through the air passages (42) of the supply-side module (40a). In the supply-side module (40a), part of the water contained in the liquid absorbent becomes water vapor to permeate the moisture permeable membranes (62), and is then applied to the supply air flowing through the air passages (42). The supply air humidified while passing through the air passages (42) of the supply-side module (40a) is then supplied indoors. As such, in the supply-side module (40a), part of the water contained in the liquid absorbent in the absorbent passages (41a) permeates the moisture permeable membranes (62) to be applied to the supply air. Thus, in the supply-side module (40a), the concentration of the liquid absorbent gradually increases while the liquid absorbent passes through the absorbent passages (41a). The high concentration liquid absorbent, which flowed out of the supply-side module (40a), is sucked by the pump (31) and sent out to the discharge-side module (40b).

Operation of Humidity Control Module

The operation of the humidity control module (40), which is each of the supply-side module (40a) and the discharge-side module (40b), will be described. The humidity control module (40) selectively performs moisture absorbing operation allowing liquid absorbent to absorb water vapor, and moisture releasing operation releasing water vapor from liquid absorbent. In the above-described dehumidifying operation, the supply-side module (40a) performs the moisture absorbing operation, and the discharge-side module (40b) performs the moisture releasing operation. In the above-described humidifying operation, the discharge-side module (40b) performs the moisture absorbing operation, and the supply-side module (40a) performs the moisture releasing operation.

Moisture Absorbing Operation

The moisture absorbing operation of the humidity control module (40) will be described with reference to FIG. 4.

During the moisture absorbing operation, relatively high concentration liquid absorbent is supplied to the absorbent passages (41) of the humidity control module (40). Part of the moisture contained in the air in the air passage (42) permeates the moisture permeable membranes (62) to be absorbed by the liquid absorbent.

In the process where the liquid absorbent absorbs the moisture, absorption heat is generated. If no measure is taken, the generated absorption heat gradually increases the temperature of the liquid absorbent to gradually reduce the amount of the moisture absorbed by the liquid absorbent. When the temperature of the air flowing through the air passages (42) is higher than the temperature of the liquid absorbent, the temperature of the liquid absorbent is increased by the heat exchange with the air. On the other hand, in the humidity control module (40) during the moisture absorbing operation, the heat transfer members (46) function as evaporators such that the refrigerant in the heat medium passages (43) cools the liquid absorbent in the absorbent passages (41), thereby reducing a temperature increase of the liquid absorbent.

In particular, in the humidity control module (40) according to this embodiment, the heat transfer tubes (70) of the heat transfer members (46) are surrounded by the liquid absorbent. Thus, the refrigerant flowing through the heat transfer tubes (70) substantially absorbs heat from the liquid absorbent only. Accordingly, in the humidity control module (40) according to this embodiment, the refrigerant flowing through the heat transfer tubes (70) efficiently cools the liquid absorbent.

Moisture Releasing Operation

The moisture releasing operation of the humidity control module (40) will be described with reference to FIG. 4.

During the moisture releasing operation, relatively low concentration liquid absorbent is supplied to the absorbent passages (41) of the humidity control module (40). Part of the water contained in the liquid absorbent becomes water vapor to permeate the moisture permeable membranes (62), and is applied to the air in the air passages (42).

In the process of discharging water from the liquid absorbent, the water being liquid deprives heat from surroundings when being gasified. If no measure is taken, the temperature of the liquid absorbent gradually decreases, and the amount of the moisture released from the liquid absorbent gradually decreases. When the temperature of the air flowing through the air passages (42) is lower than the temperature of the liquid absorbent, the temperature of the liquid absorbent is lowered by the heat exchange with the air. On the other hand, in the humidity control module (40) during the moisture releasing operation, the heat transfer members (46) function as condensers such that the refrigerant in the heat medium passages (43) heats the liquid absorbent in the absorbent passages (41), thereby reducing a decrease in the temperature of the liquid absorbent.

In particular, in the humidity control module (40) according to this embodiment, the heat transfer tubes (70) of the heat transfer members (46) are surrounded by the liquid absorbent. Thus, the heat released from the refrigerant flowing through the heat transfer tubes (70) is substantially applied to the liquid absorbent only. As a result, in the humidity control module (40) according to this embodiment, the refrigerant flowing through the heat transfer tubes (70) efficiently heats the liquid absorbent.

Advantages of First Embodiment

In the humidity control module (40) according to this embodiment, the heat transfer members (46) are disposed in the absorbent passages (41). These heat transfer members (46) form the heat medium passages (43). The heat transfer members (46) are disposed in the absorbent passages (41) and surrounded by the liquid absorbent. Almost all the heat released from the high pressure refrigerant flowing through the heat medium passages (43) is applied to the liquid absorbent in the absorbent passages (41). Almost all the heat absorbed by the low pressure refrigerant flowing through the heat medium passages (43) is the heat absorbed from the liquid absorbent in the absorbent passages (41).

This embodiment reduces a temperature change in the liquid absorbent when the liquid absorbent exchanges the moisture with the air and, resulting in miniaturization in the humidity control module (40). In this embodiment, the heat of the high pressure refrigerant is utilized without waste to heat the liquid absorbent, and the cold of the low pressure refrigerant is utilized without waste to cool the liquid absorbent. This reduces energy needed to allow the liquid absorbent to absorb and release moisture in the humidity control module (40).

In the humidity control module (40) according to this embodiment, the heat transfer tubes (70) of the heat transfer members (46) are disposed between each pair of the moisture permeable membranes (62) which are adjacent to one another with the absorbent passage (41) interposed therebetween. Thus, in this embodiment, the heat transfer tubes (70) are disposed near the moisture permeable membranes (62), where the liquid absorbent exchanges the moisture with the air. The liquid absorbent exchanging the moisture with the air reliably exchanges heat with the refrigerant flowing through the heat transfer tubes (70).

Variation of First Embodiment

Figure 8:
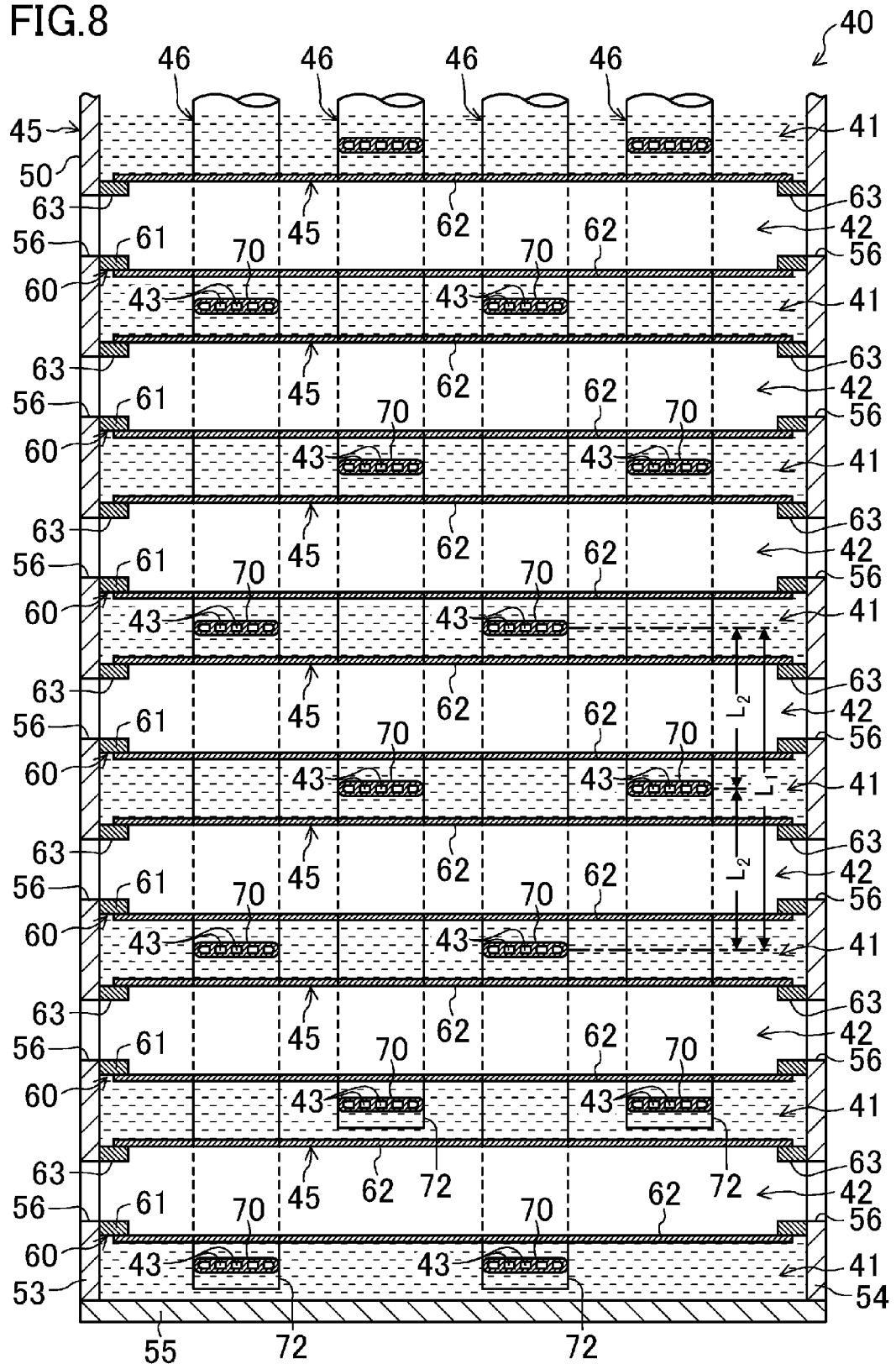
FIG. 8 is a schematic cross-sectional view taken along the horizontal cross-section of a humidity control module according to a variation of the first embodiment.

In the humidity control apparatus (10) according to this embodiment, a humidity control module (40) shown in FIG. 8 may be used as the supply-side module (40a) and the discharge-side module (40b).

As shown in FIG. 8, in the humidity control module (40) according to this variation, the number of the heat transfer members (46) provided in the humidity control module (40) and the configurations of the heat transfer members (46) are different from those in the humidity control module (40) shown in FIGS. 3-6. The differences between the humidity control module (40) according to this variation and the humidity control module (40) shown in FIGS. 3-6 will be described below.

Similar to the heat transfer members (46) shown in FIGS. 3-6, each of the heat transfer members (46) according to this variation includes a plurality of aligned heat transfer tubes (70), first headers (71) attached to the upper ends of the heat transfer tubes (70), and second headers (72) attached to the lower ends of the heat transfer tubes (70). Note that, in each heat transfer member (46) according to this variation, the distance between each pair of the aligned heat transfer tubes (70) (i.e., a pitch $L_1$ of the heat transfer tubes (70)) is twice as large as the distance between each pair of the absorbent passages (41) aligned along the alignment of the moisture permeable membranes (62) (i.e., a pitch $L_2$ of the absorbent passage (41), where $L_1=2L_2$).

In the humidity control module (40) according to this variation, four heat transfer members (46) are provided. The four heat transfer members (46) face one another. Specifically, the four heat transfer members (46) are aligned from one side plate (53) to the other side plate (54) such that the first headers (71) of the heat transfer members (46) are substantially parallel to one another and the second headers (72) of the heat transfer members (46) are substantially parallel to one another.

In the humidity control module (40) according to this variation, the position of one of the heat transfer members (46) is shifted from the adjacent one of the heat transfer members (46) by the pitch $L_2$ of the absorbent passages (41) along the alignment of the moisture permeable membranes (62). That is, in FIG. 8, the positions of the heat transfer members (46) odd-numbered from the left are shifted from the heat transfer members (46) even-numbered from the left by the pitch $L_2$ of the absorbent passages (41) along the alignment of the moisture permeable membranes (62). Thus, in FIG. 8, the heat transfer tubes (70) of the heat transfer members (46) odd-numbered from the left are located in the absorbent passages (41) odd-numbered from the bottom. The heat transfer tubes (70) of the heat transfer members (46) even-numbered from the left are located in the absorbent passages (41) even-numbered from the bottom.

In order to miniaturize the humidity control module (40), the pitch $L_2$ of the absorbent passages (41) is preferably as short as possible. On the other hand, in assembling the heat transfer members (46), the heat transfer tubes (70) need to be attached to the headers (71, 72) by brazing etc., there is thus a limit to reduce the pitch $L_1$ of the heat transfer tubes (70). In the humidity control module (40) shown in FIGS. 3-6, the pitch of the absorbent passages (41) needs to be equal to the pitch of the heat transfer tubes (70). The humidity control module (40) may be difficult to sufficiently miniaturize.

On the other hand, in the humidity control module (40) according to this variation shown in FIG. 8, the pitch $L_2$ of the absorbent passages (41) is half the pitch $L_1$ of the heat transfer tubes (70). Thus, in this variation, the pitch $L_2$ of the absorbent passages (41) can be about several mm, while securing the pitch of the heat transfer tubes (70) $L_1$ enough to assemble the heat transfer members (46), thereby miniaturizing the humidity control module (40).

Second Embodiment of Invention

A second embodiment of the present invention will be described. A humidity control module (40) according to this embodiment has different configurations from the humidity control module (40) according to the first embodiment. The humidity control module (40) according to this embodiment will be described below with reference to FIGS. 9-11 as appropriate.

Figure 9:
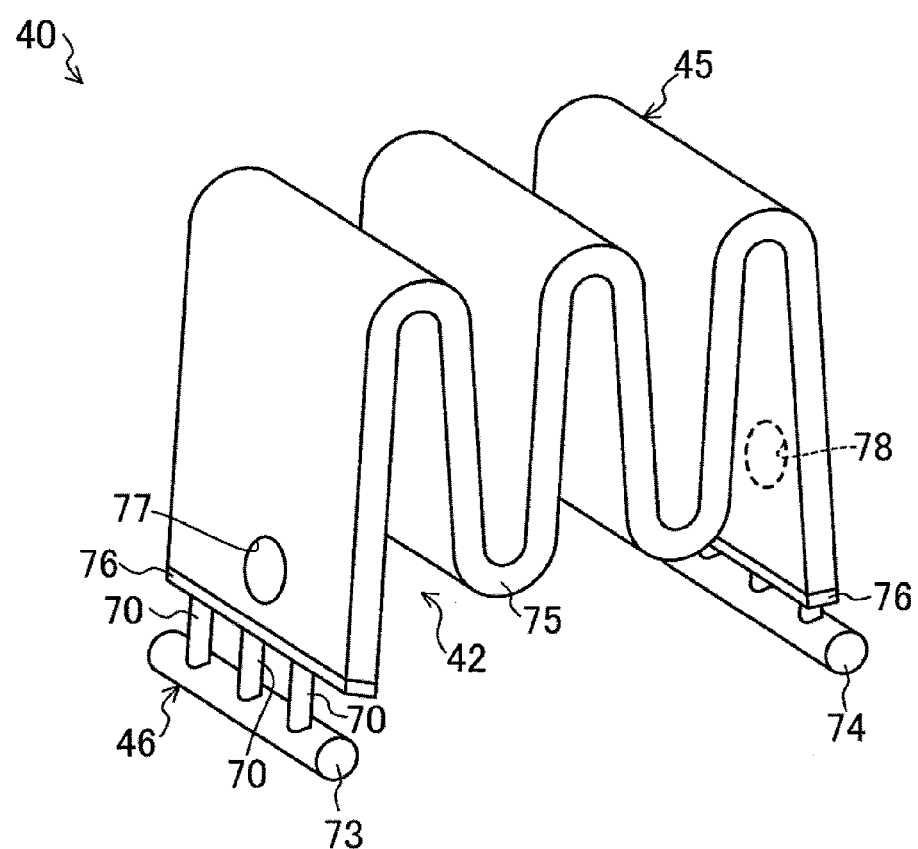
FIG. 9 is a schematic perspective view of a humidity control module according to a second embodiment.

As shown in FIGS. 9 and 10, the humidity control module (40) according to this embodiment is like a thick plate winding up and down. This humidity control module (40) includes a partition member (45) and a heat transfer member (46).

The heat transfer member (46) includes a plurality of (three in this embodiment) heat transfer tubes (70), and two headers (73, 74). The heat transfer tubes (70) are copper or aluminum circular pipes. The heat transfer tubes (70) of the heat transfer member (46) form heat medium passages (43) through which refrigerant being a heat medium flows. The heat transfer tubes (70) are circular pipes and wind up and down (see FIG. 10(A)). The plurality of heat transfer tubes (70) are arranged in parallel (FIG. 10(B)). One ends of the heat transfer tubes (70) are connected to the first header (73), and the other ends are connected to the second header (74). These headers (73, 74) are connected to a refrigerant circuit (35).

The partition member (45) winds along the heat transfer tubes (70) and surrounds all of the heat transfer tubes (70) provided in the heat transfer member (46). The upper and lower surfaces of the partition member (45) are formed by moisture permeable membranes (62). The sides of the partition member (45) are sealed by first sealing members (75), and the ends of the partition member (45) are sealed by second sealing members (76). The sealing members (75, 76) are attached to the upper moisture permeable membrane (62) and the lower moisture permeable membrane (62). The heat transfer tubes (70) of the heat transfer member (46) penetrate the sealing members (76) disposed at the ends of the partition member (45). The ends of the heat transfer tubes (70) are exposed to the outside of the partition member (45).

The partition member (45) includes an inlet (77) for allowing liquid absorbent to flow into an absorbent passage (41) and an outlet (78) for allowing the liquid absorbent to flow out of the absorbent passage (41). In the partition member (45), the inlet (77) is located close to the one end thereof, and the outlet (78) is located close to the other end thereof. The inlet (77) and the outlet (78) are connected to an absorbent circuit (30).

In the humidity control module (40) according to this embodiment, the inner space of the partition member (45) is the absorbent passage (41), and the outer space of the partition member (45) serves as an air passage (42). As described above, the partition member (45) surrounds the heat transfer tubes (70). Thus, the heat transfer tubes (70) are disposed in the absorbent passage (41) formed inside the partition member (45), and surrounded by the liquid absorbent flowing through the absorbent passage (41). Thus, similar to the humidity control module (40) according to the first embodiment, the refrigerant flowing through the heat transfer tubes (70) substantially exchanges heat with the liquid absorbent only, and does not directly exchange heat with the air in the air passage (42).

In the humidity control module (40) according to this embodiment, the liquid absorbent, which has flowed from the inlet (77) to the absorbent passage (41), flows from one end to the other end of the partition member (45). Meanwhile, the liquid absorbent exchanges the water vapor with the air in the air passage (42) via the moisture permeable membranes (62), and then flows out from the outlet (78). The refrigerant flowing through the heat transfer tubes (70) exchanges heat with the liquid absorbent surrounding the heat transfer tubes (70) to heat or cool the liquid absorbent.

Figure 11:
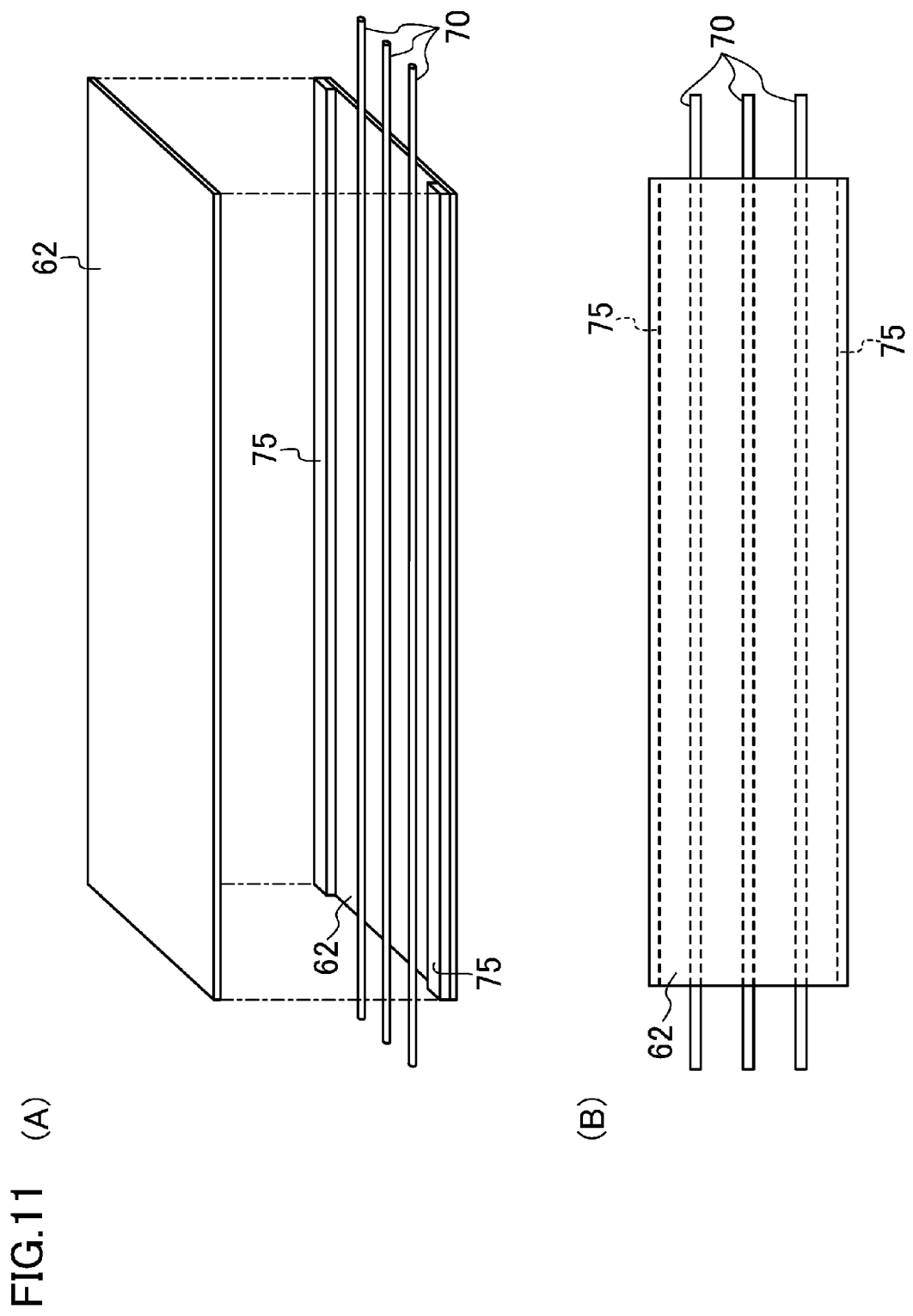
FIG. 11 illustrate a semi-finished product formed in a manufacturing process of the humidity control module according to the second embodiment.

Fabrication of the humidity control module (40) according to this embodiment will be described with reference to FIG. 11. First, two long thin rectangular moisture permeable membranes (62) are prepared. Next, three straight heat transfer tubes (70) are disposed in parallel on one of the moisture permeable membranes (62). The first sealing members (75) are disposed along the long sides of the moisture permeable membrane (62). Next, the other moisture permeable membrane (62) is disposed thereabove. The upper and lower moisture permeable membranes (62) are attached to the sealing members (75). Then, the heat transfer tubes (70) are subjected to plastic deformation into the form winding up and down. After the heat transfer tubes (70) are deformed, the moisture permeable membranes (62) and sealing members (75) become in the form winding up and down along the heat transfer tubes (70). Next, the second sealing members (76) are attached to the both ends of the moisture permeable membranes (62), and then the headers (73, 74) are attached to the both ends of the heat transfer tubes (70).

Variation of Second Embodiment

Figure 12:
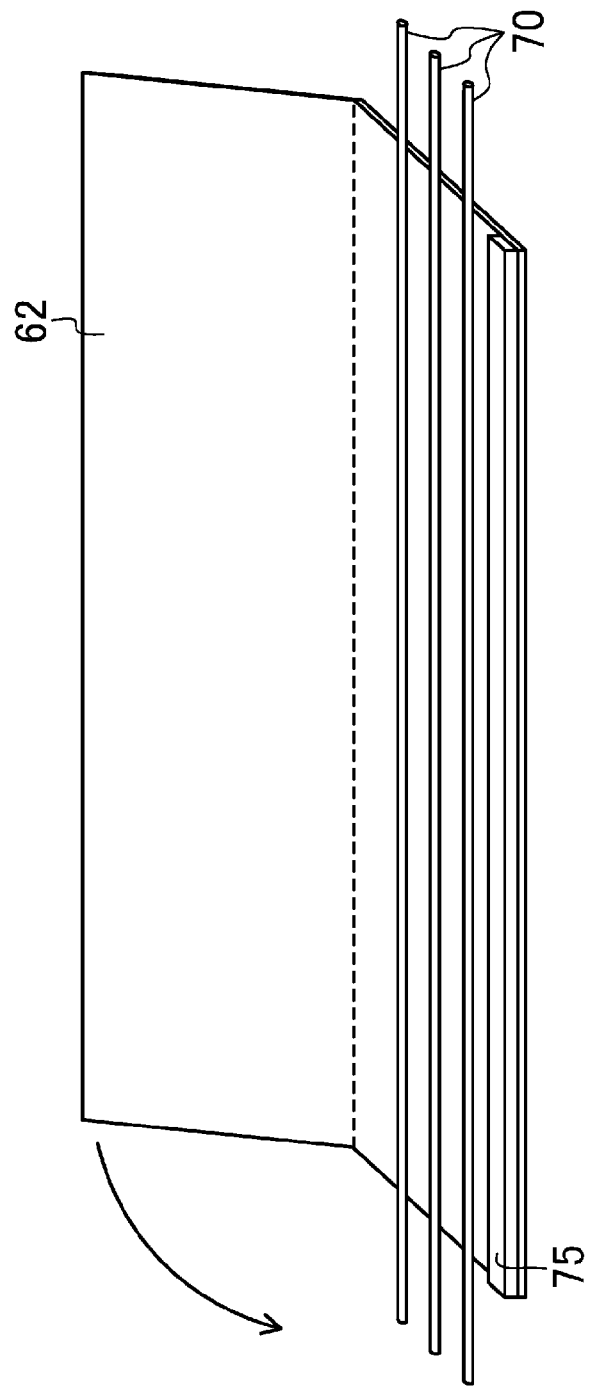
FIG. 12 is a schematic perspective view illustrating a semi-finished product formed in a manufacturing process of a humidity control module according to a variation of the second embodiment.

In the humidity control module (40) according to this embodiment, only one first sealing member (75) may be provided in the partition member (45). Specifically, as shown in FIG. 12, the width of a moisture permeable membrane (62) is twice as great as that shown in FIG. 11A. By folding the moisture permeable membrane (62) to cover the heat transfer tubes (70), only one first sealing member (75) is used.

Third Embodiment of Invention

A third embodiment according to the present invention will be described. A humidity control module (40) according to this embodiment has different configurations from the humidity control module (40) according to the first embodiment. The humidity control module (40) according to this embodiment will be described below with reference to FIGS. 13-15 as appropriate.

In the humidity control module (40) according to this embodiment, each partition member (45) is formed by a moisture permeable membrane (62) formed like a straight circular pipe. Each heat transfer member (46) is formed by a heat transfer tube (70) which is a copper or aluminum straight circular pipe. In the humidity control module (40), each heat transfer member (46) formed by the heat transfer tube (70) is inserted into one of the partition members (45), which are the circular pipe moisture permeable membranes (62). One of the heat transfer members (46) and the corresponding one of the partition members (45) form a double pipe (80) (see FIGS. 14 and 15). In this double pipe (80), the outer space of the moisture permeable membrane (62), which is the partition member (45), serves as an air passage (42). The space between the moisture permeable membrane (62) and the heat transfer tube (70), which is the heat transfer member (46), serves as an absorbent passage (41). The inner space of the heat transfer tube (70) serves as a heat medium passage (43). That is, in the humidity control module (40) according to this embodiment, the heat transfer tube (70), which is the heat transfer member (46), is surrounded by liquid absorbent in the absorbent passage (41).

The humidity control module (40) according to this embodiment includes numbers of double pipes (80). These double pipes (80) are arranged such that their axes extend substantially horizontally in parallel to one another. In the humidity control module (40), the numbers of double pipes (80) are regularly arranged vertically and horizontally at predetermined intervals. The double pipes (80) in the humidity control module (40) are in staggered arrangement.

Figure 13:
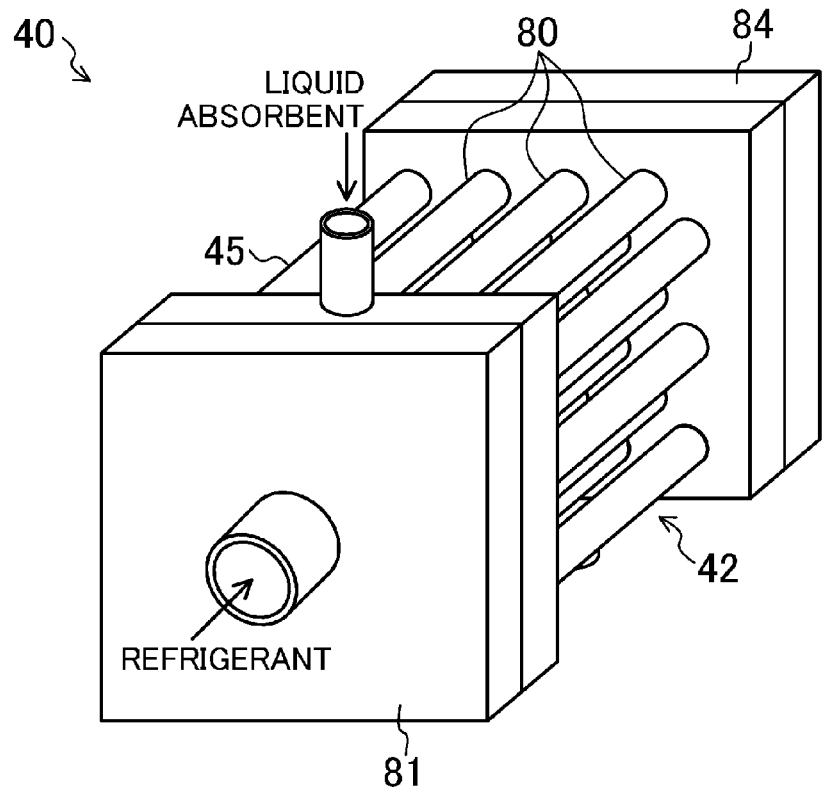
FIG. 13 is a schematic perspective view of a humidity control module according to a third embodiment.
Figure 14:
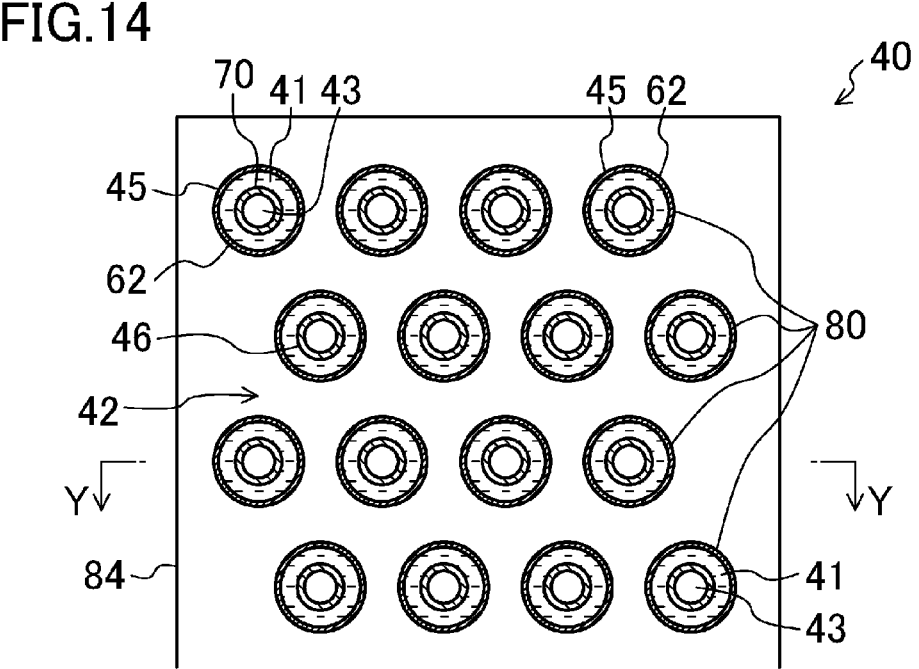
FIG. 14 is a schematic cross-sectional view taken along the vertical cross-section of the humidity control module according to the third embodiment.
Figure 15:
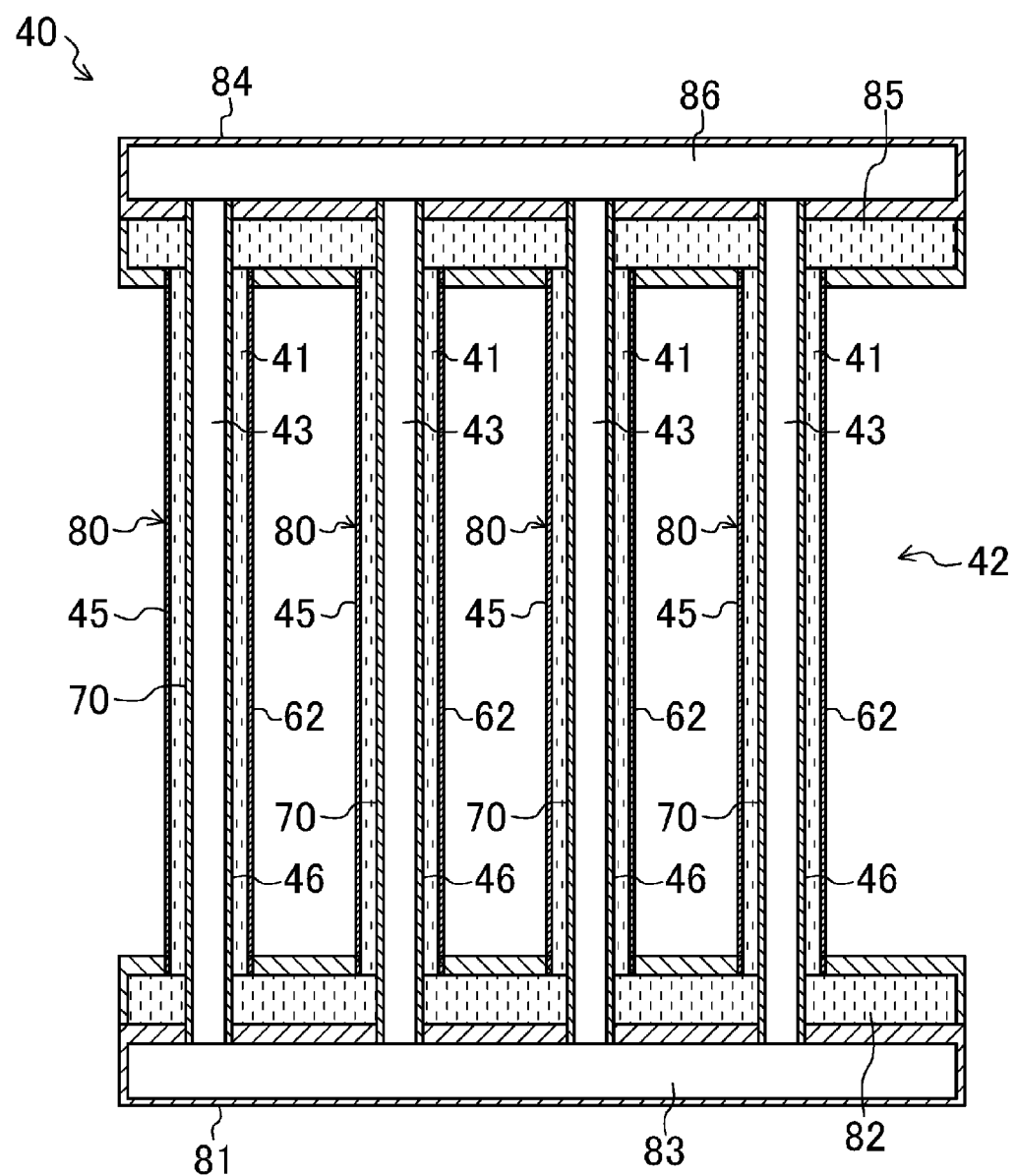
FIG. 15 is a schematic cross-sectional view taken along the line Y-Y of FIG. 14.

As shown in FIGS. 13 and 15, the humidity control module (40) includes a pair of box-like headers (81, 84). The first box-like header (81) is disposed at one ends of the double pipes (80). The second box-like header (84) is disposed at the other ends of the double pipes (80). The box-like headers (81, 84) are formed like flat rectangular parallelepiped. The inside of each box-like header (81, 84) is divided into two spaces in the thickness direction of the box-like headers (81, 84). Ones of the space are absorbent-side spaces (82, 85), and the other spaces are heat medium-side spaces (83, 86). The box-like headers (81, 84) are disposed such that the heat medium-side spaces (83, 86) face the double pipes (80), and attached to the double pipes (80). The absorbent-side spaces (82, 85) of the box-like headers (81, 84) communicate only with the absorbent passages (41), each of which is formed between one of the moisture permeable membranes (62) and the corresponding one of the heat transfer tubes (70). The heat medium-side spaces (83, 86) of the box-like headers (81, 84) communicate only with the heat medium passages (43) inside the heat transfer tubes (70).

In the humidity control module (40) according to this embodiment, the moisture permeable membranes (62), which are the partition members (45), surround the heat transfer tubes (70), which are the heat transfer members (46). Thus, the heat transfer tubes (70) are disposed in the absorbent passages (41) formed inside the moisture permeable membranes (62), and surrounded by the liquid absorbent flowing through the respective absorbent passage (41). Similar to the humidity control module (40) according to the first embodiment, the refrigerant flowing through the heat transfer tubes (70) substantially exchanges heat with the liquid absorbent only, and does not directly exchange heat with the air in the air passages (42).

In the humidity control module (40) according to this embodiment, the absorbent-side spaces (82, 85) of the box-like headers (81, 84) are connected to the absorbent circuit (30), and the heat medium-side spaces (83,86) of the box-like headers (81, 84) are connected to a refrigerant circuit (35). The liquid absorbent, which has flowed into the absorbent-side space (82) of the first box-like header (81), separately flows into the absorbent passages (41) of the double pipes (80). The liquid absorbent, which has flowed into the double pipes (80), flows from one ends to the other ends of the double pipes (80). Meanwhile, the liquid absorbent exchanges the moisture with the air in the air passages (42) via the moisture permeable membranes (62), and then flows into the absorbent-side space (85) of the second box-like header (84). The refrigerant, which has flowed into the heat medium-side space (83) of the first box-like header (81), separately flows into the heat transfer tubes (70) of the double pipes (80). The refrigerant, which has flowed into the heat medium passages (43) in the heat transfer tubes (70), flows from one ends to the other ends of the heat transfer tubes (70). Meanwhile, the refrigerant exchanges heat with the liquid absorbent surrounding the heat transfer tubes (70) to heat or cool the liquid absorbent. After that, the refrigerant flows from the heat transfer tubes (70) into the heat medium-side space (86) of the second box-like header (84).

First Variation of Third Embodiment

In the humidity control module (40) according to this embodiment, each double pipe (80) may be provided with support ribs (96) for keeping the distance between the moisture permeable membrane (62) and the heat transfer tube (70). For example, if the moisture permeable membranes (62) are thin, which are the partition members (45), the moisture permeable membranes (62) may warp and be unable to keeping the distances between the moisture permeable membranes (62) and the heat transfer tubes (70). In this case, as in this variation, the double pipes (80) are preferably provided with the support ribs (96) such that the support ribs (96) support the moisture permeable membranes (62).

Figure 16:
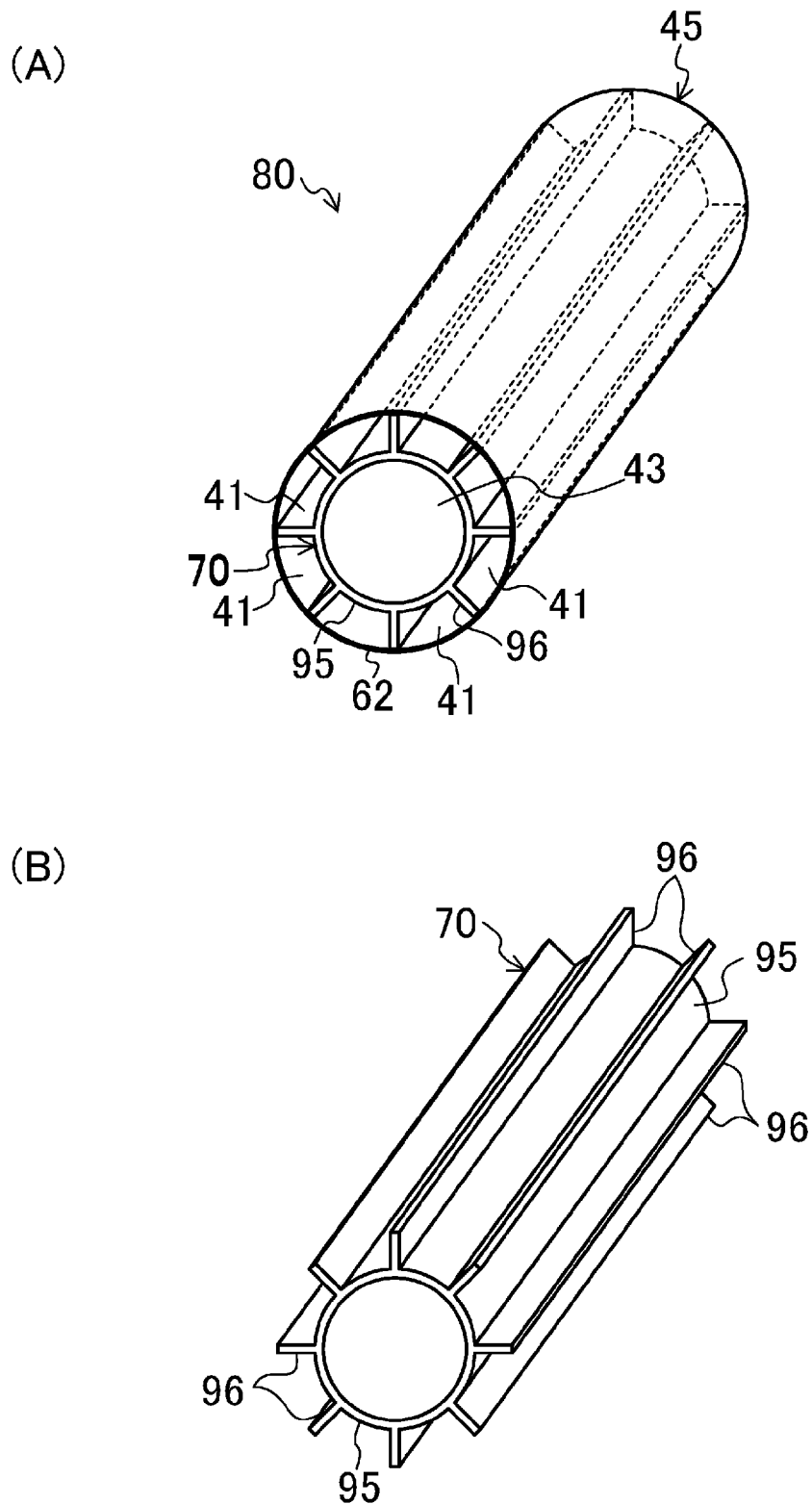
FIG. 16 illustrate the configuration of a double pipe according to a first variation of the third embodiment.

As shown in FIG. 16, each heat transfer tube (70) according to this variation forming the double pipe (80) includes a single pipe body (95) and the plurality of support ribs (96). The pipe body (95) and the support ribs (96) are integrally formed. Like the heat transfer tubes (70) shown in FIGS. 14 and 15, the heat transfer tubes (70) are made of copper or aluminum.

The pipe body (95) is a straight circular pipe. The support ribs (96) are formed like flat plates extending along the axis of the pipe body (95). In each heat transfer tube (70), the plurality of support ribs (96) radially project from the outer peripheral surface of the pipe body (95). The inner surface of the moisture permeable membrane (62), which is the partition member (45), is in contact with the tips of the support ribs (96). In each double pipe (80) according to this variation, the inner space of the pipe body (95) of the heat transfer tube (70) serves as a heat medium passage (43), and the space between the pipe body (95) of the heat transfer tube (70) and the moisture permeable membrane (62) serves as an absorbent passage (41).

Steps of manufacturing each double pipe (80) according to this variation will be described with reference to FIG. 17. First, as shown in FIG. 17(*a*), the heat transfer tube (70), on which the plurality of support ribs (96) are radially formed, and the moisture permeable membrane (62) like a square sheet are prepared. Next, as shown in FIG. 17(*b*), a resin bonding member (97) fills the space between each adjacent pair of the support ribs (96). The bonding member (97) is made of resin capable of welding the moisture permeable membrane (62), for example, perfluoro ethylene/propylene copolymer (PFEP) or tetrafluoro ethylene/hexafluoro propylene copolymer resin. One side of the moisture permeable membrane (62) is welded to the bonding member (97), and the moisture permeable membrane (62) is wound around the heat transfer tube (70). Finally, the other side of the moisture permeable membrane (62) is welded to the bonding member (97), thereby completing the double pipe (80) shown in FIG. 17(*c*).

Second Variation of Third Embodiment

In each double pipe (80) according to the first variation, the support ribs (96) may be formed independently from the heat transfer tube (70). In this case, the heat transfer tube (70) includes the pipe body (95) only. In this case, the support ribs (96) are made of resin (e.g., PFEP) capable of welding the moisture permeable membrane (62). The support ribs (96) are formed like long thin flat plates similar to those shown in FIG. 16.

Steps of manufacturing each double pipe (80) according to this variation will be described with reference to FIG. 18. First, as shown in FIG. 18(*a*), the heat transfer tube (70) and the moisture permeable membrane (62) like a the square sheet are prepared. The plurality of support ribs (96) are arranged on the moisture permeable membrane (62) at regular intervals, and are welded to the moisture permeable membrane (62). At this time, the support ribs (96) are, in an upright position, arranged in parallel to the side of the moisture permeable membrane (62). Next, as shown in FIG. 18(*b*), the moisture permeable membrane (62) with the support ribs (96) is wound around the heat transfer tube (70). At this time, at least part of the tip surfaces of the support ribs (96) is adhered to the outer peripheral surface of the heat transfer tube (70) with an adhesive agent. The wind end side and the wind start side of the moisture permeable membrane (62) are overlapped and welded together, thereby completing the double pipe (80) shown in FIG. 18(*c*).

Third Variation of Third Embodiment

In each double pipe (80) according to the first variation, the heat transfer tube (70) may be made of resin (e.g., PFEP) capable of welding the moisture permeable membrane (62). That is, in each heat transfer tube (70) according to this variation, a pipe body (95) and support ribs (96) are made of resin capable of welding a moisture permeable membrane (62).

Figure 19:
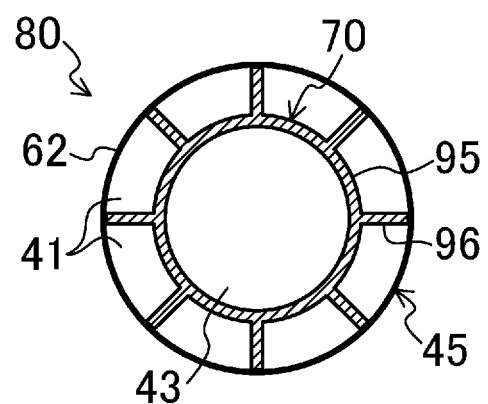
FIG. 19 is a cross-sectional view illustrating the configuration of a double pipe according to a third variation of the third embodiment.

As shown in FIG. 19, the bonding member (97) according to the first variation is not formed in the double pipe (80) according to this variation. In this double pipe (80), the moisture permeable membrane (62) is welded to the tips of the support ribs (96).

Fourth Variation of Third Embodiment

In the double pipes (80) according to the first to third variations, the forms of the support ribs (96) are not limited to the flat plates. For example, as shown in FIG. 20, the support ribs (96) may be spiral plates. Support ribs (96) according to this variation are formed independently from a pipe body (95) of a heat transfer tube (70). Then, the support ribs (96) are attached to the pipe body (95) to project from the outer peripheral surface of the pipe body (95). In each double pipe (80) according to this variation, an absorbent passage (41) formed between the pipe body (95) and a moisture permeable membrane (62) is a spiral passage divided by the support ribs (96).

Fifth Variation of Third Embodiment

In the double pipes (80) according to the first to four variations, a net-like sheet may be provided along the inner surface of each moisture permeable membrane (62) formed like a circular pipe. The net-like sheet is made of a relatively high rigidity material such as metal. In each double pipe (80) according to this variation, the portion of the moisture permeable membrane (62) not coming into contact with support ribs (96) is supported by the net-like sheet. The liquid absorbent flowing through the absorbent passage (41) passes through the net-like sheet to come into contact with the moisture permeable membrane (62).

Fourth Embodiment of Invention

A fourth embodiment of the present invention will be described. A humidity control module (40) according to this embodiment has different configurations from the humidity control module (40) according to the first embodiment. The humidity control module (40) according to this embodiment will be described with reference to FIG. 21.

As shown in FIG. 21(A), the humidity control module (40) according to this embodiment includes a plurality of film units (90), a pair of absorbent-side headers (91), and a pair of refrigerant-side headers (92). Each film unit (90) is formed like a flat rectangle. The plurality of film units (90) are arranged horizontally at regular intervals with their side surfaces facing one another. In the humidity control module (40) according to this embodiment, the space between each adjacent pair of the film units (90) serves as an air passage (42).

As shown in FIG. 21(B), each film unit (90) includes a partition member (45) and a heat transfer member (46). The partition member (45) is formed like a flat rectangular parallelepiped. The right and left sides of this partition member (45) are formed by moisture permeable membranes (62). The partition member (45) contains a heat transfer tube (70) forming the heat transfer member (46). The heat transfer tube (70) is a flat tube, which forms a heat medium passage (43). In the film unit (90), the inner space of the partition member (45) serves as an absorbent passage (41). The heat transfer tube (70) is disposed in this absorbent passage (41).

In the humidity control module (40) according to this embodiment, a single absorbent-side header (91) and a single refrigerant-side header (92) are disposed at each of the upper and lower ends. The absorbent-side headers (91) are attached to the partition members (45) of the film units (90), and have internal spaces communicating with the absorbent passages (41) of the film units (90). The refrigerant-side headers (92) are attached to the heat transfer tubes (70) of the film units (90), and have internal spaces communicating with the heat medium passages (43) of the film units (90).

In the humidity control module (40) according to this embodiment, the inner spaces of the partition members (45) serve as absorbent passages (41), and the outer spaces of the partition members (45) serve as air passages (42). As described above, the partition members (45) surround the heat transfer tubes (70). Thus, the heat transfer tubes (70) are disposed in the absorbent passages (41) formed inside the partition members (45), and surrounded by the liquid absorbent flowing through the absorbent passages (41). Thus, similar to the humidity control module (40) according to the first embodiment, the refrigerant flowing through the heat transfer tubes (70) substantially exchanges heat with the liquid absorbent only, and does not directly exchange heat with the air in the air passages (42).

Variation of Fourth Embodiment

As shown in FIG. 22, in the humidity control module (40) according to this embodiment, the heat transfer tubes (70) provided in the film units (90) may be circular pipes winding up and down. In this case as well, in the film units (90), the heat transfer tubes (70) are surrounded by the liquid absorbent flowing through the absorbent passages (41). Thus, the refrigerant flowing through the heat transfer tubes (70) substantially exchanges heat with the liquid absorbent only, and does not exchange heat with the air in the air passages (42).

Another Embodiment

Figure 23:
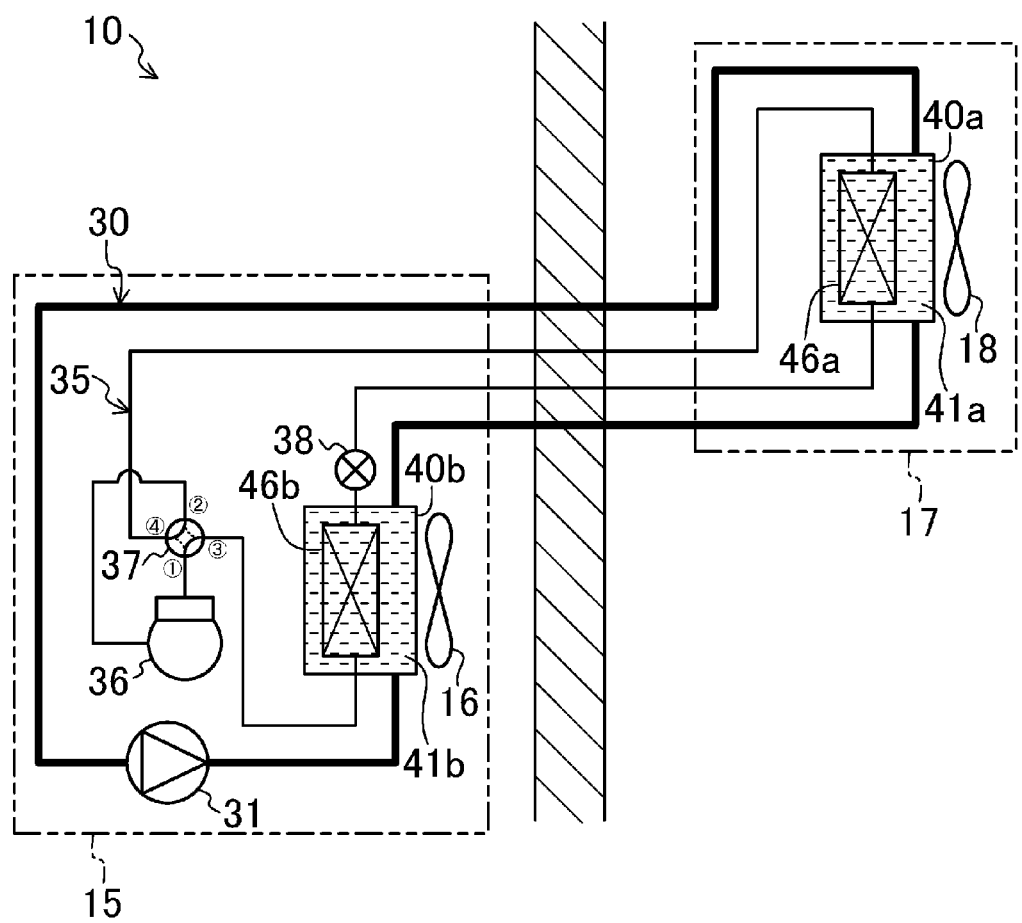
FIG. 23 illustrates the schematic configuration of a humidity control apparatus according to another embodiment.

As shown in FIG. 23, in each of the humidity control apparatuses (10) according to the above-described embodiments, the supply-side module (40a) and the discharge-side module (40b) may be disposed in different units.

Specifically, a humidity control apparatus (10) according to this variation includes an outdoor unit (15) and an indoor unit (17). The outdoor unit (15) contains a pump (31) of an absorbent circuit (30); a compressor (36), a four-way valve (37), and an expansion valve (38) of a refrigerant circuit (35); and a discharge-side module (40b). The outdoor unit (15) includes an outdoor fan (16) supplying outdoor air to a discharge-side module (40b). On the other hand, an indoor unit (17) contains a supply-side module (40a). The indoor unit (17) also includes an indoor fan (18) supplying indoor air to the supply-side module (40a).

During dehumidifying operation, the humidity control apparatus (10) according to this variation sends back indoors, the indoor air dehumidified in the supply-side module (40a), and discharges outdoors, the outdoor air humidified in the discharge-side module (40b). On the other hand, during humidifying operation, the humidity control apparatus (10) according to this variation sends back indoors, the indoor air humidified in the supply-side module (40a), and discharges outdoors, the outdoor air dehumidified in the discharge-side module (40b).

As described above, the embodiments and variations have been described as intrinsically preferred examples, and are not intended to limit the scope of the present invention, applications, and uses.

INDUSTRIAL APPLICABILITY

As described above, the present invention is useful for humidity control modules for controlling the humidity of air using liquid absorbent, and humidity control apparatuses including the humidity control modules.

DESCRIPTION OF REFERENCE CHARACTERS

10 Humidity Control Apparatus
16 Outdoor Fan
18 Indoor Fan
27 Supply Fan (Fan)
28 Discharge Fan (Fan)
30 Absorbent Circuit
35 Refrigerant Circuit (Heat Medium Circuit)
40 Humidity Control Module
41 Absorbent Passage
42 Air Passage
43 Heat Medium Passage
45 Partition Member
46 Heat Transfer Member
62 Moisture permeable membrane
70 Heat Transfer Tube
71 First Header
72 Second Header

The invention claimed is:

1. A humidity control module for humidifying or dehumidifying air using liquid absorbent, the module comprising:
a partition member wholly or partially formed by a moisture permeable membrane not allowing the liquid absorbent to permeate but allowing water vapor to permeate, the partition member separating an air passage through which the air flows, from an absorbent passage through which the liquid absorbent flows; and
a heat transfer member forming a heat medium passage through which a heat medium for heating or cooling flows, and disposed in the absorbent passage to allow the liquid absorbent flowing around the heat transfer member to exchange heat with the heat medium, wherein
the heat transfer member includes heat transfer tubes, and each of the heat transfer tubes is a flat tube having an internal space divided into a plurality of channels.

2. The humidity control module of claim 1, wherein
in the partition member, the moisture permeable membrane includes a plurality of plane-like moisture permeable membranes arranged at predetermined intervals to face one another,
the air passage and the absorbent passage includes a plurality of air passages, and a plurality of absorbent passages, respectively, and
the air passages and the absorbent passages are alternately formed along alignment of the moisture permeable membranes.

3. The humidity control module of claim 2, wherein
each of the heat transfer tubes is disposed between a pair of the moisture permeable membranes, which are adjacent with one of the absorbent passages interposed therebetween.

4. The humidity control module of claim 3, wherein
the heat transfer member includes
the heat transfer tube including a plurality of heat transfer tubes,
a first header connected to one end of each of the heat transfer tubes, and
a second header connected to another end of each of the heat transfer tubes.

5. The humidity control module of claim 4, wherein
the heat transfer member includes a plurality of heat transfer members,
in each of the heat transfer members, the plurality of heat transfer tubes are aligned in parallel to one another,
the plurality of heat transfer members face one another, and
in an adjacent pair of the heat transfer members, the heat transfer tubes of one of the heat transfer members and the heat transfer tubes of the other one of the heat transfer members are disposed in different ones of the absorbent passages.

6. A humidity control module for humidifying or dehumidifying air using liquid absorbent, the module comprising:
- a partition member wholly or partially formed by a moisture permeable membrane not allowing the liquid absorbent to permeate but allowing water vapor to permeate, the partition member separating an air passage through which the air flows, from an absorbent passage through which the liquid absorbent flows; and
- a heat transfer member forming a heat medium passage through which a heat medium for heating or cooling flows, and disposed in the absorbent passage to allow the liquid absorbent flowing around the heat transfer member to exchange heat with the heat medium, wherein
- the heat transfer member includes a heat transfer tube through which the heat medium flows,
- the partition member surrounds the heat transfer tube, and
- an inside of the partition member serves as the absorbent passage, and an outside of the partition member serves as the air passage.

7. The humidity control module of claim 6, wherein the heat transfer tube is in a winding form, and the partition member is in a form winding along the heat transfer tube.

8. The humidity control module of claim 6, wherein the partition member is formed like a pipe extending along the heat transfer tube.

9. A humidity control apparatus comprising:
- the humidity control module of claim 1;
- an absorbent circuit connected to the absorbent passage of the humidity control module to supply the liquid absorbent to the absorbent passage;
- a heat medium circuit connected to the heat medium passage of the humidity control module to supply the heat medium for heating or cooling to the heat medium passage; and
- fans for supplying the air to the air passage of the humidity control module, wherein
- the humidity control apparatus humidifies or dehumidifies the air flowing through the air passage of the humidity control module.

* * * * *